(12) United States Patent
Eguchi et al.

(10) Patent No.: US 7,342,563 B2
(45) Date of Patent: Mar. 11, 2008

(54) SUBSTRATE ASSEMBLY, METHOD OF TESTING THE SUBSTRATE ASSEMBLY, ELECTROOPTICAL DEVICE, METHOD OF MANUFACTURING THE ELECTROOPTICAL DEVICE, AND ELECTRONIC EQUIPMENT

(75) Inventors: Tsukasa Eguchi, Suwa (JP); Shinsuke Fujikawa, Suwa (JP); Tokuro Ozawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 941 days.

(21) Appl. No.: 10/166,281

(22) Filed: Jun. 11, 2002

(65) Prior Publication Data

US 2002/0191140 A1 Dec. 19, 2002

(30) Foreign Application Priority Data

| | | | |
|---|---|---|---|
| Jun. 13, 2001 | (JP) | | 2001-179042 |
| Jun. 13, 2001 | (JP) | | 2001-179101 |
| Apr. 24, 2002 | (JP) | | 2002-122815 |

(51) Int. Cl.
*G09G 3/36* (2006.01)

(52) U.S. Cl. ............... 345/90; 345/55; 345/87
(58) Field of Classification Search ............ 345/90, 345/55, 87
See application file for complete search history.

(56) References Cited

U.S. PATENT DOCUMENTS

| 5,945,972 | A | * | 8/1999 | Okumura et al. ............ 345/98 |
| 6,750,926 | B2 | * | 6/2004 | Ohgiichi et al. ............ 349/40 |
| 2002/0116445 | A1 | | 8/2002 | Huh |

FOREIGN PATENT DOCUMENTS

| JP | 4-242724 | | 8/1992 |
| JP | 2000-236005 | * | 8/2000 |
| KR | 10-2000-0077275 | * | 12/2000 |
| KR | 2000-0077275 | | 12/2000 |

* cited by examiner

*Primary Examiner*—Richard Hjerpe
*Assistant Examiner*—Leonid Shapiro
(74) *Attorney, Agent, or Firm*—Oliff & Berridge, PLC

(57) ABSTRACT

The present invention provides a systems and methods to perform an electrical test on a substrate assembly used as a TFT array substrate of a liquid-crystal device without detaching a mounted external IC. The substrate assembly can include a substrate, a peripheral circuit embedded in the substrate, a first wiring arranged on the substrate, and an external IC, mounted on the substrate, and having a first terminal connected to an interconnection portion arranged on the first wiring. The substrate assembly can further include a second wiring which extends from the interconnection portion in such a manner that the second wiring is routed in a portion of the substrate facing the integrated circuit, and a first external circuit connection terminal arranged on the second wiring in a portion of the substrate not facing the integrated circuit. The external IC is thus tested through the external circuit connection terminal.

12 Claims, 14 Drawing Sheets

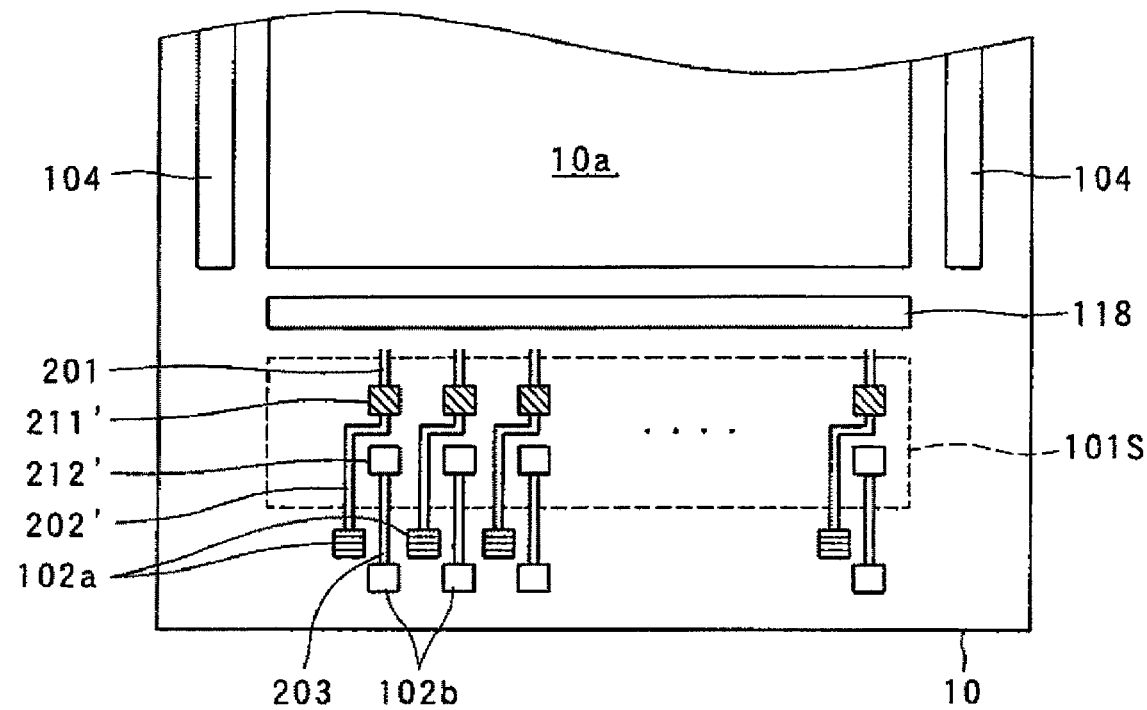
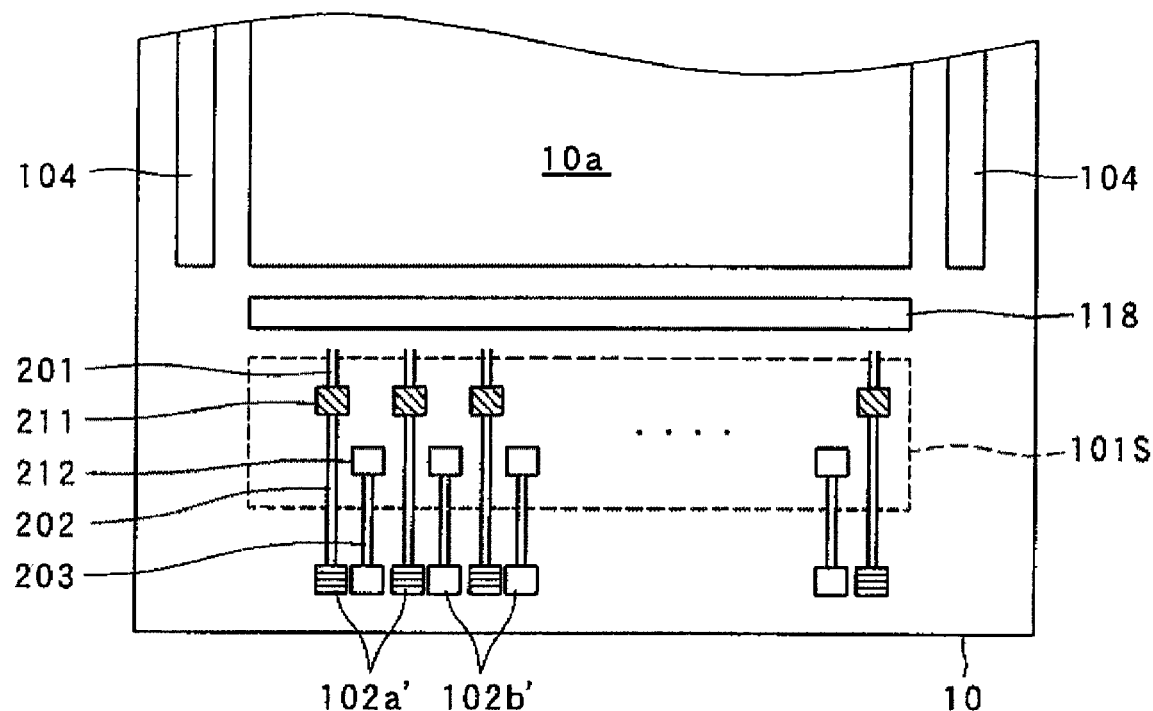

SUBSTRATE ASSEMBLY, METHOD OF TESTING THE SUBSTRATE ASSEMBLY, ELECTROOPTICAL DEVICE, METHOD OF MANUFACTURING THE ELECTROOPTICAL DEVICE, AND ELECTRONIC EQUIPMENT

BACKGROUND OF THE INVENTION

1. Field of Invention

The present invention relates to a technical field of a substrate assembly that can be used as a TFT array substrate in an electrooptical device, such as a liquid-crystal device, and of an electrical test method of the substrate assembly. The present invention additionally relates to a technical field of an electrooptical device, such as a liquid-crystal device including such a substrate, of a manufacturing method of manufacturing the electrooptical device, and of a variety of pieces of electronic equipment including the electrooptical device.

2. Description of Related Art

In an electrooptical device, such as a thin-film transistor (TFT) driving liquid-crystal device, a thin-film transistor using high-temperature polysilicon, low-temperature polysilicon, or amorphous silicon, as a semiconductor layer is embedded in each pixel for switching controlling of the pixel on an insulator such as a glass substrate or a quartz substrate.

The polysilicon TFTs are generally excellent in transistor characteristics and power consumption. For this reason, satisfactory transistor characteristics and low power consumption features result if a peripheral circuit composed of such polysilicon TFTs is embedded in a peripheral area surrounding an image display area within which a number of pixel electrodes are arranged. The arrangement is advantageous because the TFTs within the image display area for pixel switching and TFTs forming the peripheral circuit are concurrently produced in the same manufacturing process.

On the other hand, the amorphous type TFTs are generally outperformed in transistor characteristics and power consumption properties by the polysilicon TFTs. For this reason, the peripheral circuit, fabricated of the amorphous silicon TFTs, typically fails to achieve satisfactory transistor characteristics and low power consumption. When the amorphous silicon TFTs are adopted as a pixel switching TFT, a technique in which an external integrated circuit (IC) is mounted in a peripheral area is widely accepted.

SUMMARY OF THE INVENTION

According to studies, the technique to embed a peripheral circuit fabricated of the above-mentioned polysilicon TFT has difficulty in embedding a peripheral circuit meeting a high driving frequency requirement and a low-power consumption requirement. Such requirements are typically imposed by high definition display image. For this reason, preferably, an external IC is mounted in a peripheral area, and part of the function of the peripheral circuit is thus shouldered by this external IC. For example, a technique disclosed in Japanese Unexamined Patent Application Publication 04-242724 is known.

If the external integrated circuit is further mounted on a substrate in which the peripheral circuit is already embedded as discussed, it becomes extremely difficult to identify which one of the peripheral circuit and the external IC is faulty or malfunctions when any of the peripheral circuit and the external IC is faulty or malfunctions after production or shipment. In case of the fault or malfunction, the external IC is detached from the substrate, and electrical examinations must be performed on the external IC alone. This method is impracticable.

The technique to mount the external IC on the substrate having the peripheral circuit embedded therewithin has not advanced in practice.

Another problem facing the external IC is that if the external IC is mounted on the peripheral area, a relatively wide peripheral area is required to accommodate a variety of above-mentioned trace patterns for testing, evaluating, and monitoring the manufacturing process, and the external IC. A significant portion of the limited area of the substrate is occupied by these trace patterns and the external IC. As a result, it becomes difficult to meet the general requirements that the substrate be compact while enlarging the image display area within the limited substrate area.

If the external IC is mounted on the substrate in which the peripheral circuit is embedded, on the other hand, a significant portion of the limited area of the substrate is also occupied by the peripheral circuit and the external IC. As a result, it also becomes difficult to meet the general requirements that the substrate be compact while enlarging the image display area within the limited substrate area.

For this reason, no significant advances have been made in the technique to mount the external IC on the substrate in which a variety of trace patterns for testing, evaluating and monitoring the manufacturing process, and the peripheral circuit are embedded.

In view of the above problems, the present invention has been developed. It is thus an object of the present invention to provide a substrate assembly which is electrically tested without detaching the external IC therefrom while enjoying the advantage of a peripheral circuit and the advantage of an external IC. It is a further object of the present invention to provide a test method of the substrate assembly through which the substrate assembly is relatively easily subjected to the electrical test, an electrooptical device including the substrate assembly, and electronic equipment including the electrooptical device.

In view of the above problems, the present invention has been developed. It is an object of the present invention to provide an electrooptical device which assures a wide image display area within the limited area of the substrate, a manufacturing method of the electrooptical device, and electronic equipment including the electrooptical device.

To achieve the above-referenced problems, a substrate assembly of the present invention can include a substrate, a peripheral circuit embedded in the substrate, a first wiring arranged on the substrate, and an integrated circuit having a first terminal connected to an interconnection portion arranged on the first wiring on the substrate. The invention can further include a second wiring which extends from the interconnection portion in such a manner that the second wiring is routed in a portion of the substrate facing the integrated circuit, and a first external circuit connection terminal arranged on the second wiring in a portion of the substrate not facing the integrated circuit.

In accordance with the substrate assembly of the present invention, the peripheral circuit is embedded in the substrate, and the integrated circuit is then mounted on the substrate. The peripheral circuit is thus embedded in the same manufacturing process as that of a thin-film transistor when the thin-film transistor using high-temperature polysilicon, low-temperature polysilicon, or amorphous silicon as a semiconductor layer is formed on the substrate. On the other hand, an integrated circuit manufactured of a transistor outperforming the first thin-film transistor in switching characteristics and power consumption is mounted on the substrate. A portion of the function required of a circuit on the substrate is shouldered by the peripheral circuit, while the other portion of the function required of the circuit on the substrate is shouldered by the integrated circuit mounted on the same substrate. In this way, the major advantages of the peripheral circuit, namely, a simple manufacturing process and a simple laminate structure, a compact design and the major advantages of the integrated circuit, namely, high performance and low power consumption, are enjoyed in a well balance.

The first terminal of the integrated circuit is connected to the interconnection portion arranged on the first wiring, and the second wiring extends from the interconnection portion in such a manner that the second wiring is routed in the portion of the substrate facing the integrated circuit. The first external circuit connection terminal is arranged on the second wiring in the portion of the substrate not facing the integrated circuit. Since the first external circuit connection terminal connected to the first terminal of the integrated circuit through the second wiring is arranged clear of the integrated circuit on the substrate, any signal is exchanged between the integrated circuit and an external test instrument through the first external circuit connection terminal. For example, if the first terminal serves as an output terminal of the integrated circuit, the output characteristics of the integrated circuit are tested at the first external circuit connection terminal using the external text instrument.

Even if the peripheral circuit and the integrated circuit coexist on the same substrate, it is not necessary to detach the integrated circuit when a fault or malfunction is found after the integrated circuit is mounted. It is possible to pick up a signal output from the integrated circuit, and it is possible to determine which one of the peripheral circuit and the integrated circuit is faulty. In other words, detaching the integrated circuit and bringing a test probe to the output terminal are not necessary during test. This arrangement is very useful for testing the substrate assembly.

The substrate assembly of the present invention enjoys both the advantages of the peripheral circuit and the advantages of the integrated circuit while allowing electrical tests to be performed without the need for detaching the integrated circuit.

In one embodiment of the present invention, the interconnection portion may be an interconnection pad arranged on the substrate. In accordance with this embodiment, by connecting the first terminal of the integrated circuit to the interconnection portion, namely, the interconnection pad, a reliable electrical connection is relatively easily established.

In another embodiment of the present invention, the substrate assembly may include a third wiring routed through the portion of the substrate facing the integrated circuit, and a second external circuit connection terminal arranged on the third wiring in the portion of the substrate not facing the integrated circuit. Further, the integrated circuit can additionally include a second terminal, which is connected to another interconnection portion arranged on the third wiring. In accordance with this embodiment of the present invention, the second terminal of the integrated circuit can be connected to the interconnection portion, such as the interconnection pad arranged on the third wiring, and is connected to the second external circuit connection terminal through the third wiring. Since the second external circuit connection terminal connected to the second terminal of the integrated circuit is arranged clear of the integrated circuit on the substrate, any signal is exchanged between the integrated circuit and an external device through the second external circuit connection terminal after the integrated circuit is mounted on the substrate. For example, when the second terminal is used as an input terminal, a variety of signals such as a video signal, a control signal, and a power source signal are input to the second external circuit connection terminal, thereby to the integrated circuit.

In this embodiment, preferably, the first terminal may be an output terminal of the integrated circuit, the second terminal may be an input terminal of the integrated circuit, the first external circuit connection terminal may be a test terminal for picking up an output signal from the integrated circuit, and the second external circuit connection terminal may be a drive terminal for inputting a variety of signals for operating the substrate assembly. In this arrangement, a variety of signals can be fed to the integrated circuit at the second external circuit connection terminal, while an output of the integrated circuit may be tested at the first external circuit connection terminal.

In the embodiment in which the integrated circuit has the first terminal and the second terminal, the first terminal and the second terminal may be positioned on the surface of the integrated circuit facing the substrate. Although in this arrangement, the input terminal and the output terminal arranged on the surface of the integrated circuit facing the substrate are hidden below the package of the integrated circuit after the integrated circuit is mounted, the output of the integrated circuit is tested at the first external circuit connection terminal from outside.

It should be understood that any mounting method of the integrated circuit applicable in this invention may be used, such as a wire bonding method, a flipchip method, a beam lead method, besides COG (Chip on Glass) method, and with such a mounting method, the integrated circuit in any of a DIP package, a flatpack package, a chip-carrier package and the like. This arrangement allows the integrated circuit to be tested through the first external circuit connection terminal even after the integrated circuit is mounted. Since the first terminal or the second terminal is hidden in the above-referenced integrated circuit, the present invention is particularly useful.

A plurality of first terminals and a plurality of second terminals may be arranged and positioned in a zigzag configuration on the surface of the integrated circuit facing the substrate. In this arrangement, the second wiring is extended toward the second terminal in perpendicular to the alignment of the first terminal on the substrate. In this way, the end of the second wiring runs between adjacent second terminals and reaches the opposite side of the second terminal. The second wirings and the third wirings alternate with each other while reaching the first and second external connection terminals.

The first and second external circuit connection terminals may be arranged in a zigzag fashion. In this arrangement, the first and second external circuit connection terminals do not overlap each other even if the area of each of them is expanded.

A plurality of first terminals and a plurality of second terminals may not be arranged in a zigzag fashion. The second wiring may be arranged in a planar trace pattern evading the first wiring and the second terminal. A plurality of first external circuit connection terminals and a plurality of second external circuit connection terminals may be arranged in a line.

In yet another embodiment of the substrate assembly of the present invention, the peripheral circuit may include a polysilicon thin-film transistor. Because of its high-temperature or low-temperature polysilicon thin-film transistor in this embodiment, the peripheral circuit has relatively excellent transistor characteristics and low power consumption while the integrated circuit becomes excellent in transistor characteristics and power consumption. A driving circuit having a very excellent performance as a whole is provided by the peripheral circuit and the integrated circuit.

In one embodiment of the substrate assembly of the present invention, another integrated circuit instead of the peripheral circuit is mounted on the substrate.

In this embodiment, the function of the driving circuit required of the substrate assembly is shouldered by two integrated circuits, and the flexibility of design is increased.

To resolve the aforementioned problems, a test method of testing the above-referenced substrate assembly of the present invention (including the embodiments thereof) includes a step of bringing a test probe into contact with the first external circuit connection terminal after the integrated circuit is connected to the substrate, and a test step of performing an electrical testing on the integrated circuit through the test probe.

In accordance with the test method of the substrate assembly of the present invention, subsequent to the manufacture or shipment of the substrate assembly, the test probe is put into contact with the first external circuit connection terminal, and then an electrical test is carried out on the integrated circuit through the test probe. The electrical test is very easily conducted on the integrated circuit through the test probe without the need for detaching the integrated circuit for test purposes.

In another embodiment, the test method of the present invention for testing the substrate assembly may further include another test step of performing an electrical test on the peripheral circuit before the integrated circuit is mounted to the substrate.

In accordance with this embodiment, the test probe is brought into contact with the first external circuit connection terminal connected to the peripheral circuit, or another external circuit connection terminal connected to the peripheral circuit in the middle of the manufacturing process of the substrate assembly prior to the mounting of the integrated circuit. The peripheral circuit is thus electrically tested through the test probe. Prior to the mounting of the integrated circuit, the peripheral circuit is electrically tested, and subsequent to the mounting of the integrated circuit, the integrated circuit is electrically tested through the first external circuit connection terminal.

To resolve the aforementioned problems, a first electrooptical device of the present invention can include, on the substrate assembly (including the embodiments thereof), a pixel electrode, a thin-film transistor connected to the pixel electrode, and a data line and a scanning line respectively connected to the thin-film transistor, wherein each of the peripheral circuit and the integrated circuit includes a portion of a circuit for driving the data line and the scanning line.

The first electrooptical device of the present invention performs so-called active-matrix driving in which a pixel electrode is switch-controlled by the thin-film transistor through the data line and the scanning line. A data line driving circuit and a scanning line driving circuit for respectively driving the data line and the scanning line are partly included in the peripheral circuit, and partly included in the integrated circuit. The thin-film transistor forming the peripheral circuit is manufactured in the same manufacturing process as that of the thin-film transistor for control-switching the pixel electrode. Specifically, the major advantages of the peripheral circuit, namely, a simple manufacturing process, a simple laminate structure, and a compact design are promoted. Furthermore, the major advantages of the integrated circuit, namely, high performance and low power consumption, are promoted. With the substrate assembly of the present invention as discussed above, the integrated circuit is tested through the first external circuit connection terminal from outside even when the integrated circuit is mounted on the substrate.

In one embodiment of the first electrooptical device of the present invention, the peripheral circuit and the integrated circuit can be arranged in a peripheral area surrounding an image display area within which a plurality of pixel electrodes are arranged.

In accordance with this embodiment, the substrate assembly contains the peripheral circuit and the integrated circuit as the peripheral circuits.

In another embodiment of the first electrooptical device of the present invention, the peripheral circuit may include a sampling switch circuit connected to the data line, wherein the integrated circuit includes a driving circuit, having a shift register, for driving the data line and the scanning line.

In accordance with this embodiment, the driving circuit having the shift register contained in the integrated circuit drives the data line and the scanning line, and the sampling circuit contained in the peripheral circuit samples the video signal. A high-quality image is thus presented on the screen.

To resolve the aforementioned problems, a second electrooptical device of the present invention can include, on a substrate, a pixel electrode, at least one of a wiring and an electronic element for driving the pixel electrode, an integrated circuit which, mounted on the substrate, forms at least a portion of a driving circuit connected to at least the one of the wiring and the electronic element, and a predetermined trace patterns arranged beneath the integrated circuit.

In accordance with the second electrooptical device of the present invention, the pixel electrode is driven in an active-matrix driving method or a passive-matrix driving method by the driving circuit through the wirings such as the scanning line, the data line, and a capacitive line, and the electronic elements such as the thin-film transistor, the thin-film diode, and the storage capacitor. At least a portion of the driving circuit can be formed of the integrated circuit mounted on the substrate. When the electronic element is fabricated of a thin-film transistor with amorphous silicon, low-temperature polysilicon, or high-temperature polysilicon used as a semiconductor layer, a variety of performances, including switching performance and low-power consumption, is substantially improved, compared with the case in which the driving circuit is formed of the peripheral circuit which is embedded in the same manufacturing process of the thin-film transistor.

Arranged beneath the integrated circuit are predetermined trace patterns including an evaluation trace pattern of the manufacturing process, which can be optically or visually monitored prior to the mounting of the integrated circuit, a test trace pattern for testing the manufacturing process, a monitoring trace pattern for monitoring the manufacturing process, and a trace pattern for evaluating the electronic element. Since the integrated circuit overlaps the predetermined trace patterns, an area occupied by the predetermined trace patterns and the integrated circuit is accordingly reduced. The image display area within which the electrode pixels are arranged becomes relatively large in the limited area of the substrate.

The predetermined trace patterns may be used in the manufacturing process prior to the mounting of the integrated circuit, while not being used subsequent to the mounting of the integrated circuit. In this arrangement, the predetermined trace patterns are deployed in the major portion of the mounting area of the integrated circuit. Since the predetermined trace patterns thus formed are not used subsequent to the mounting of the integrated circuit, the area of the predetermined trace patterns and the mounting area of the integrated circuit can fully overlap each other. The space occupied by the predetermined trace patterns and the integrated circuit on the substrate is efficiently reduced.

In yet another embodiment of the second electrooptical device of the present invention, the predetermined trace patterns may include at least one of a trace pattern for evaluating a manufacturing process, a trace pattern for testing the manufacturing process, a trace pattern for monitoring the manufacturing process, and a trace pattern for evaluating the electronic element, while being formed in an area of the substrate other than an interconnection pad to which the input and output terminals of the external integrated circuit are connected.

At least one of the trace pattern for evaluating the manufacturing process, the trace pattern for testing the manufacturing process, the trace pattern for monitoring the manufacturing process, and the trace pattern for evaluating the electronic element, is formed in the area other than the interconnection pads to which the input and output terminals of the integrated circuit are connected. The manufacturing process is evaluated, tested, and monitored using the predetermined trace patterns until a manufacturing step immediately prior to the mounting of the integrated circuit.

To resolve the aforementioned problems, a third electrooptical device of the present invention can include, on a substrate, a pixel electrode, at least one of a wiring and an electronic element for driving the pixel electrode, an integrated circuit which, mounted on the substrate, forms at least a portion of a driving circuit connected to at least the one of the wiring and the electronic element, and a bottom circuit arranged beneath the integrated circuit and embedded together with at least the one of the wiring and the electronic element.

In accordance with the third electrooptical device of the present invention, the pixel electrode can be driven in an active-matrix driving method or a passive-matrix driving method by the driving circuit through the wirings, such as the scanning line, the data line, and a capacitive line, and the electronic elements, such as the thin-film transistor, the thin-film diode, and the storage capacitor. At least a portion of the driving circuit can be formed of the integrated circuit mounted on the substrate. When the electronic element is fabricated of a thin-film transistor with amorphous silicon, low-temperature polysilicon, or high-temperature polysilicon used as a semiconductor layer, a variety of performances, including switching performance and low-power consumption, is substantially improved, compared with the case in which the driving circuit is formed of the peripheral circuit which is embedded in the same manufacturing process of the thin-film transistor. A portion of the driving circuit and the bottom circuit, such as the test circuit, are arranged beneath the integrated circuit. Since the integrated circuit overlaps the bottom circuit, an area occupied by the bottom circuit and the integrated circuit is accordingly reduced. The image display area within which the electrode pixels are arranged becomes relatively large in the limited area of the substrate.

In one embodiment of the third electrooptical device of the present invention, the integrated circuit may form a portion of the driving circuit, and the bottom circuit may form the other portion of the driving circuit. Since the one portion of the driving circuit contained in the integrated circuit and the other portion of the driving circuit contained in the bottom circuit overlap each other within the area of the substrate in accordance with this embodiment, the image display area becomes relatively large within the limited area of the substrate.

The wiring may include a data line and a scanning line, the integrated circuit may include a data line driving circuit for driving the data line, and the bottom circuit may include a scanning line driving circuit for driving the scanning line and a sampling circuit for sampling a video signal and supplying the data line with the sampled video signal.

In this arrangement, a high-performance integrated circuit is responsible for the data line driving circuit having a high driving frequency and high switching characteristics, and the bottom circuit is responsible for the scanning line driving circuit and the sampling circuit, each having a low driving frequency and a modestly high switching performance. Generally, performance imbalance is reduced while the image display area is efficiently expanded.

In yet another embodiment of the third electrooptical device of the present invention, the bottom circuit may include a test circuit. In accordance with this embodiment, the test circuit for testing the electronic element, the wiring, and the bottom circuit formed on the substrate is arranged beneath the integrated circuit. Prior to the mounting of the integrated circuit, the electronic element, the wiring, the bottom circuit, etc. can be tested using the test circuit. After the integrated circuit is mounted, the test circuit may end its usefulness. However, if the input and output terminals of the integrated circuit are installed clear of the integrated circuit on the substrate, the test circuit is still used even after the integrated circuit is mounted.

In a still further embodiment of the third electrooptical device of the present invention, the electronic element may include a thin-film transistor connected to the pixel electrode, and the bottom circuit may include a thin-film transistor which is manufactured through the same manufacturing process as that of the first thin-film transistor. Since the thin-film transistor connected to the pixel electrode in the image display area and the thin-film transistor contained in the bottom circuit are manufactured in the same manufacturing process, the manufacturing process and the laminate structure on the substrate are simplified. For example, the thin-film transistor is manufactured of a semiconductor layer of amorphous silicon, low-temperature polysilicon, or high-temperature polysilicon.

In a still further embodiment of the third electrooptical device of the present invention, an insulator may be formed between the integrated circuit and the bottom circuit. In accordance with this embodiment, the insulator formed between the integrated circuit and the bottom circuit reliably isolates one from the other regardless of insulation performance in the package of the integrated circuit.

In another embodiment of the second and third electrooptical devices of the present invention, the integrated circuit may be arranged in a peripheral area surrounding an image display area within which the pixel electrode is arranged. Since the integrated circuit is arranged in the peripheral area in this embodiment, the image display area is efficiently expanded.

In yet another embodiment of the second and third electrooptical device of the present invention, the integrated circuit may be arranged on the substrate using the COG (Chip On Glass) method. In accordance with this embodiment, the surface of the substrate beneath the integrated circuit is fully hidden below the package of the integrated circuit after the integrated circuit is mounted or glued on the substrate by area, and the predetermined trace patterns or the bottom circuit is already arranged. A variety of advantages of the predetermined trace patterns and the bottom circuit as discussed above are thus enjoyed.

In yet another embodiment of the second and third electrooptical devices of the present invention, the top layer of the substrate on which the integrated circuit is mounted may be planarized.

Although asperities generally exist in any of layers in a laminate structure in accordance with the predetermined trace patterns and the bottom circuit, the top layer of the substrate is planarized using a CMP (Chemical Mechanical Polishing) process or forming a planarizing layer through spin coating in the above embodiment. The integrated circuit is thus easily mounted on the predetermined trace patterns or the bottom circuit. Even if the integrated circuit is a surface mounting type, such as a COG type integrated circuit or a flatpack type integrated circuit, the integrated circuit is mounted on a planarized surface without any problems.

To resolve the aforementioned problems, a manufacturing method of the present invention of manufacturing the second electrooptical device (the embodiments thereof) can include a first formation step for forming a predetermined trace pattern within a predetermined area on the substrate, and a test step for performing at least one of the test, evaluation, and monitoring of a manufacturing process in accordance with the predetermined trace pattern. The method can further include a second formation step for forming at least the one of the wiring and the electronic element, and a step of mounting the integrated circuit on the predetermined area.

In accordance with the manufacturing method of manufacturing the second electrooptical device, the predetermined trace patterns can be formed within the predetermined area on the substrate, at least one of the test, evaluation, and monitoring of the manufacturing process is performed in accordance with the predetermined trace pattern, and subsequent to or prior to the test, evaluation, and monitoring, the wiring, the electronic element, and the pixel electrodes are formed. Subsequent to these processes, the integrated circuit is mounted on the predetermined area. Since the test, evaluation, or monitoring of the manufacturing process is completed in accordance with the predetermined trace pattern prior to the mounting of the integrated circuit, the same predetermined area is utilized as an area for the formation of the predetermined trace pattern and as the mounting area of the integrated circuit at different timings. This arrangement is very advantageous to efficiently use the limited area of the substrate.

To solve the aforementioned problems, a manufacturing method of the present invention of manufacturing the third electrooptical device (and the embodiments thereof) can include a formation step of forming a peripheral circuit within a predetermined area on the substrate, the one of the wiring and the electronic element, and the pixel electrode, and a step of mounting the integrated circuit on the predetermined area.

In accordance with the manufacturing method of the third electrooptical device of the present invention, the bottom circuit, the wiring, the electronic element, the pixel electrode, etc. are firstly formed within the predetermined area on the substrate. Subsequent to these processes, the integrated circuit is mounted on the predetermined area. The same predetermined area serves as both the formation area of the bottom circuit and the mounting area of the integrated circuit, and this arrangement is very advantageous from the standpoint of efficient use of the limited area of the substrate.

In another embodiment of the second electrooptical device of the present invention, the predetermined trace pattern may include at least one of an alignment mark and an identification mark. In accordance with this embodiment, the predetermined trace pattern can include the alignment mark used to align the substrate, and the identification mark used to identify a lot number of the substrate. These marks typically end the usefulness thereof prior to the mounting of the external integrated circuit in a relatively later phase of the production of the electrooptical device. Conventionally, even after the electrooptical device has been manufactured, however, the marks may remain visible, and thus may unnecessarily occupy an area of the substrate.

In this embodiment, the predetermined trace pattern includes the alignment mark, the identification mark, etc. These marks come under the integrated circuit. With the integrated circuit overlapping these marks, the area occupied by the marks and the integrated circuit can be narrowed accordingly. As already discussed, the alignment mark, the identification mark, etc. no longer necessary are only covered with the integrated circuit, substantially with no problems. Accordingly, this arrangement allows the image display area having the pixel electrodes arranged therewithin to be relatively expanded in the limited area of the substrate.

In another embodiment of the third electrooptical device of the present invention, the bottom circuit may include a circuit element, and the electrooptical device may include a lead wiring extending from the circuit element, and an external circuit connection terminal for the bottom circuit connected to the lead wiring in a portion of the substrate not facing the integrated circuit. In accordance with this embodiment, the bottom circuit containing the test circuit, for example, includes circuit elements such as a thin-film transistor and a thin-film diode, and a lead wiring and an external circuit connection terminal for the bottom circuit are connected to the circuit elements. Thus in this embodiment, even after the integrated circuit is mounted on the substrate, the bottom circuit of the substrate and the circuit elements contained in the bottom circuit are used. For example, when the bottom circuit is a TEG (Test Element Group) or the test circuit, the testing may be carried out on the electrooptical device even after the integrated circuit is mounted.

To resolve the aforementioned problems, a fourth electrooptical device of the present invention includes a substrate, a peripheral circuit embedded in the substrate, a first wiring arranged on the substrate, an integrated circuit including a first terminal connected to an interconnection portion arranged on the first wiring on the substrate, a second wiring which extends from the interconnection portion in such a manner that the second wiring is routed in a portion of the substrate facing the integrated circuit, and a first external circuit connection terminal arranged on the second wiring in a portion of the substrate not facing the integrated circuit. The electrooptical device can further include, on the substrate, a pixel electrode, and at least one of a wiring and an electronic element for driving the pixel electrode. The integrated circuit, mounted on the substrate, forms at least a portion of a driving circuit connected to at least the one of the wiring and the electronic element. A predetermined trace pattern or a bottom circuit is arranged beneath the integrated circuit.

The fourth electrooptical device of the present invention can include a combination of the requirements of the first electrooptical device and the requirements of the second or third electrooptical device. The present invention thus provides the aforementioned advantages of the first electrooptical device that the electrical test is performed without the need for detaching the integrated circuit and the advantages of the peripheral circuit and the advantages of the integrated circuit. Furthermore, the present invention provides the advantages of the second or third electrooptical device that the predetermined trace pattern or the bottom circuit is arranged beneath the integrated circuit. Therefore, as the integrated circuit overlaps the predetermined trace pattern or the bottom circuit, the area occupied by the predetermined trace pattern or the bottom circuit can be narrowed accordingly in the area of the substrate. The image display area within which the pixel electrodes are arranged becomes relatively large in the limited area of the substrate.

If the requirements of the first, second, and third electrooptical devices of the present invention are combined, the above-referenced advantages are concurrently provided. Furthermore, thin and compact designs are implemented, while the image display area is expanded. An electrooptical device that satisfies two mutually contradictory requirements of a compact design and a large screen results.

In this specification, the peripheral circuit can be included in the bottom circuit, and vice versa.

To resolve the aforementioned problems, electronic equipment of the present invention can include the first electrooptical device (and the embodiments thereof), or the second or third electrooptical device of the present invention (and the embodiments thereof), or the fourth electrooptical device.

The electronic equipment of the present invention including the first electrooptical device of the present invention can present a high-quality image, and allows the electrical test to be performed without the need for detaching the integrated circuit. Such equipment may be any of a diversity of electronic equipment including a liquid-crystal display television, a mobile telephone, an electronic pocketbook, a word processor, a viewfinder type or direct monitoring type video cassette recorder, a workstation, a video phone, a POS terminal, a touch panel, a projection-type display apparatus, and the like.

The electronic equipment of the present invention including the second or third electrooptical device of the present invention provides an image display area relatively wide with respect to the size of the body of the electronic equipment and implements a compact design. Such equipment may be any of a diversity of electronic equipment including a liquid-crystal display television, a mobile telephone, an electronic pocketbook, a word processor, a viewfinder type or direct monitoring type video cassette recorder, a workstation, a video phone, a POS terminal, a touch panel, a projection-type display apparatus, and the like.

The electronic equipment of the present invention including the fourth electrooptical device provides the two advantages of the aforementioned electronic equipment which are simultaneously achieved.

These and other operations and advantages of the present invention will become apparent from the following description of the embodiments.

BRIEF DESCRIPTION OF THE DRAWINGS

The invention will be described with reference to the accompanying drawings wherein like numerals reference like elements, and wherein:

FIG. 4 is a plan view illustrating a portion of the substrate assembly where the external IC is to be mounted in accordance with a modification of the substrate assembly of the present invention;

FIG. 5 is a plan view illustrating a portion of the substrate assembly where the external IC is mounted in accordance with another modification of the substrate assembly of the present invention;

DETAILED DESCRIPTION OF PREFERRED EMBODIMENTS

Figure 1:
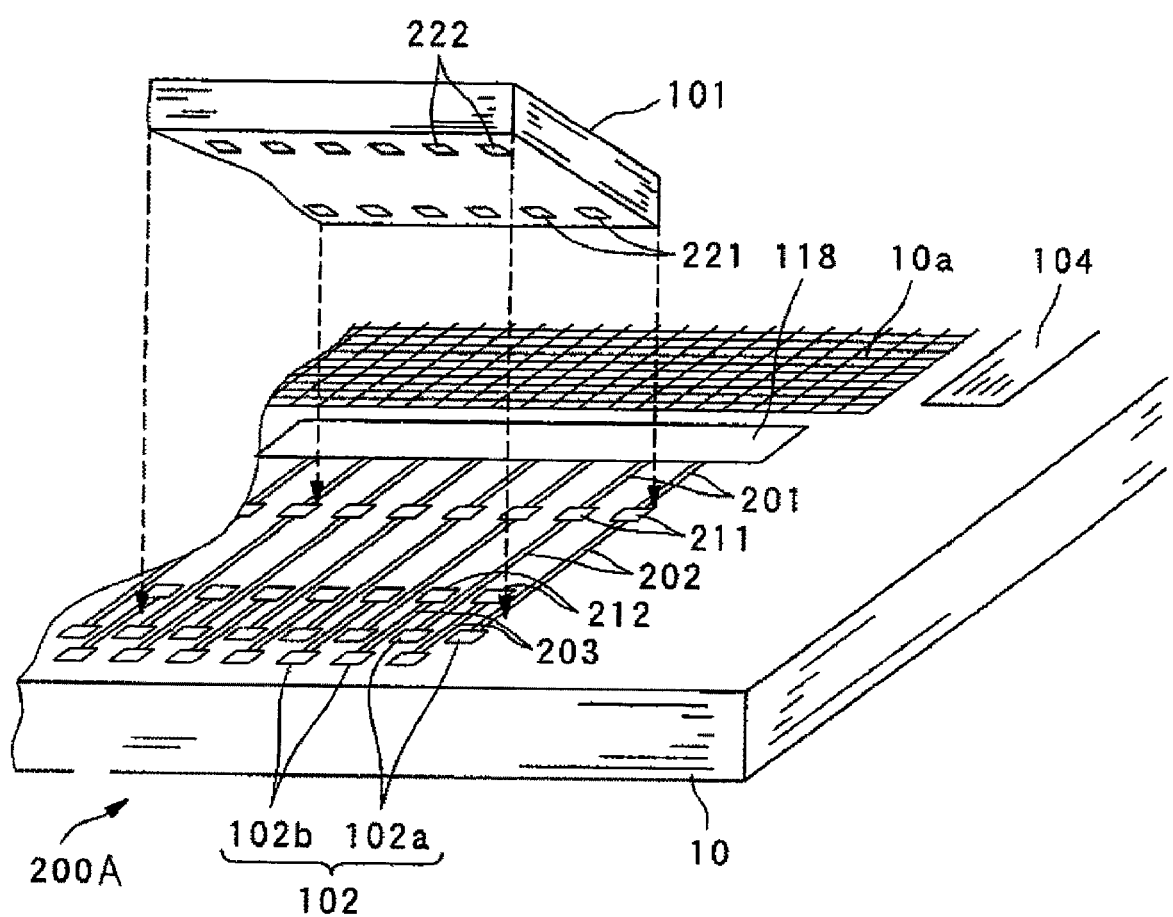
FIG. 1 is a perspective view three-dimensionally illustrating a portion of an external IC and its associated components in accordance with the first embodiment of the substrate assembly of the present invention.
Figure 2:
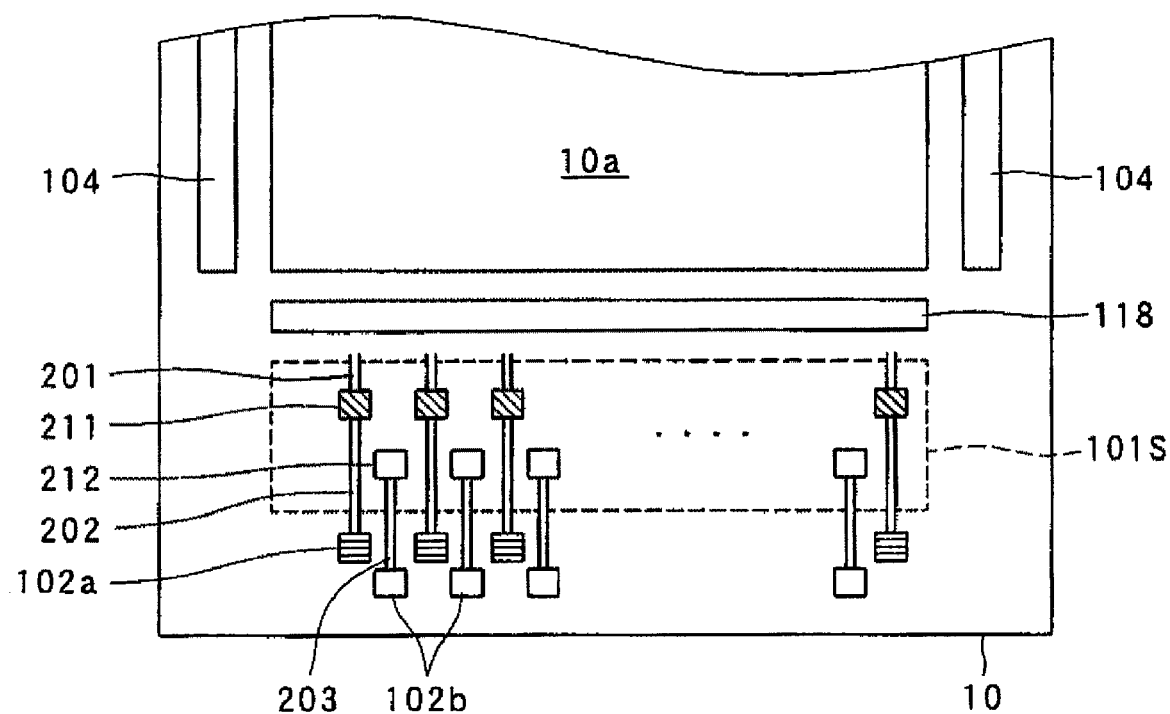
FIG. 2 is a plan view illustrating a portion of the substrate assembly where the external IC is to be mounted in accordance with the first embodiment of the substrate assembly of the present invention.
Figure 3:
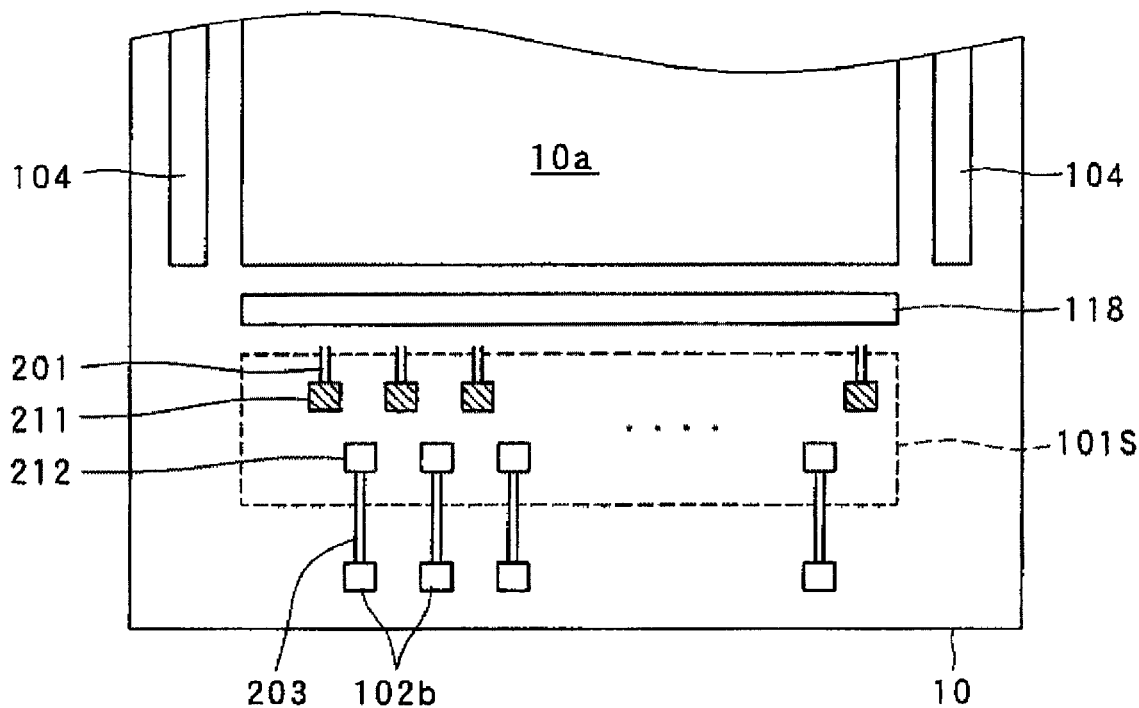
FIG. 3 is a plan view illustrating a portion of the substrate assembly where the external IC is to be mounted in a comparative substrate assembly.

A first embodiment of the substrate assembly of the present invention will be discussed with reference to FIG. 1 through FIG. 5. FIG. 1 is a three-dimensional, exploded perspective view of an external IC and the surrounding portion thereof in the first embodiment of the substrate assembly of the present invention, FIG. 2 is a plan view of the substrate assembly in and near the mounting area of the external IC, FIG. 3 is a plan view of the substrate assembly in and near the mounting area of the external IC in a comparative substrate assembly. FIG. 4 is a plan view of the substrate assembly in and near the mounting area of the external IC in a modification of the embodiment, and FIG. 5 is a plan view of the substrate assembly in and near the mounting area of the external IC in another modification of the embodiment.

The substrate assembly of the first embodiment is preferably used as a TFT array substrate having a peripheral circuit and a COG type IC in a liquid-crystal device in one example of an electrooptical device to be described later. Specifically, the substrate assembly of the first embodiment includes a COG type IC as an external IC, and a driving circuit of the liquid-crystal device is formed of the COG type IC and the peripheral circuit.

Referring to FIG. 1 and FIG. 2, the substrate assembly 200A of the first embodiment can include a TFT array substrate 10, a scanning line driving circuit 104 and a sampling circuit 118 embedded in the TFT array substrate 10 as one example of a peripheral circuit, first wirings 201, second wirings 202, and third wirings 203 arranged on the TFT array substrate 10, and a data line driving circuit 101 arranged on the TFT array substrate 10 and formed of a COG type IC as one example of an external IC.

The scanning line driving circuit 104 is a driving circuit for driving an unshown scanning line arranged in an image display area 10a. The sampling circuit 118, including sampling switches, samples a video signal on an video signal line (not shown), and feeds the sampled video signal to unshown data lines arranged within the image display area 10a. The data line driving circuit 101 is formed of a COG type IC having output terminals 221 as first terminals, and input terminals 222 as second terminals. The scanning line driving circuit 104 and the sampling circuit 118, as one example of the peripheral circuit, includes high-temperature polysilicon TFTs or low-temperature polysilicon TFTs which are manufactured in the same manufacturing process as that of pixel switching TFTs which are embedded into the image display area 10a as will be described later.

The scanning line driving circuit 104, the sampling circuit 118, the data line driving circuit 101, and the image display area 10a will be described in detail below in the discussion of the embodiments of the electrooptical device.

The output terminal 221 of the data line driving circuit 101 is connected to an interconnection pad 211 as an interconnection portion arranged on the first wiring 201 within an area 101S (a rectangular area outlined by a broken line as shown in FIG. 2) on which the data line driving circuit 101 is mounted in the TFT array substrate 10. The input terminal 222 of the data line driving circuit 101 is connected to an interconnection pad 212 as one example of another interconnection portion arranged on the third wiring 203 within the area 101S on which the data line driving circuit 101 is mounted in the TFT array substrate 10.

The first wiring 201 extends from the interconnection pad 211 beyond the area 101S of the TFT array substrate 10, and thus reaches the sampling circuit 118.

The second wiring 202 extends from the interconnection pad 211 beyond the area 101S of the TFT array substrate 10 and reaches a first external circuit connection terminal 102a arranged along the edge of the substrate 10.

The third wiring 203 extends from the interconnection pad 212 beyond the area 101S of the TFT array substrate 10 and reaches a second external circuit connection terminal 102b arranged along the edge of the substrate 10.

In the first embodiment, external circuit connection terminals 102 including the first external circuit connection terminal 102a and the second external circuit connection terminal 102b are arranged along the edge of the TFT array substrate 10. The external circuit connection terminals 102 are positioned clear of the area 101S on the TFT array substrate 10.

The test method of the substrate assembly 200A thus constructed is described below.

Before mounting the data line driving circuit 101 formed of the COG type IC, the scanning line driving circuit 104 and the sampling circuit 118, as the peripheral circuit, and the data line, the scanning line, the pixel switching TFT, the capacitive line, and a storage capacitor mounted within the image display area 10a are electrically tested through the first external circuit connection terminal 102a and the second external circuit connection terminal 102b.

Then, after mounting the data line driving circuit 101 formed of the COG type IC, or after completing the manufacture of the substrate assembly 200A or the electrooptical device containing the substrate assembly 200A, or at a fault or malfunction of the substrate assembly 200A or the electrooptical device after the shipment thereof, a test probe is brought into contact with the first external circuit connection terminal 102a. Through the test probe, an electrical test is conducted on the data line driving circuit 101 as the external IC. Specifically, besides basic electrical continuity test and insulation test, a variety of tests can be performed. For example, a diversity of input signals such as a video signal, a control signal, and a power source signal can be input to the second external circuit connection terminals 102b connected the input terminals 222 of the data line driving circuit 101, and output signals that can be continuously output from the first external circuit connection terminals 102a connected to the output terminals 221 of the data line driving circuit 101 can be compared with the output signals to be normally obtained.

When the second wiring 202 and the first external circuit connection terminal 102a are not used in the arrangement of the first embodiment with reference to the comparative substrate assembly in FIG. 3, the output of the data line driving circuit 101 cannot be tested once the data line driving circuit 101 as the external IC is mounted on the TFT array substrate 10, or the output may be tested with the data line driving circuit 101 detached from the TFT array substrate 10. When any fault is found, it is impossible to determine which one of the peripheral circuit composed of the scanning line driving circuit, the sampling circuit and the external IC is faulty.

As described above, in the substrate assembly 200A of the first embodiment, a portion of the function required of a circuit on the TFT array substrate 10 is shouldered by the peripheral circuit composed of the sampling circuit 118 and the scanning line driving circuit 104, and the other portion of the function required of the circuit on the TFT array substrate 10 is shouldered by the data line driving circuit 101 as the separate IC. When the device is faulty or malfunctions, an external test instrument may test the output signal of the data line driving circuit 101 as the separate IC through the first external circuit connection terminal 102a without the need for detaching the data line driving circuit 101 from the TFT array substrate 10.

In the first embodiment, the data line driving circuit 101 is formed of the COG type IC. After the mounting of the data line driving circuit 101, the output terminal 221 and the input terminal 222 arranged on the mounting surface of the COG type IC are hidden below the package body of the COG type IC. However, the output signals of the COG type IC forming the data line driving circuit 101 and the peripheral circuit are tested from outside through the first external circuit connection terminal 102*a* without any problems.

Rather than in the COG type IC, the data line driving circuit 101 maybe formed in any of a variety of packages, such as a DIP package, a flatpack package, a chip carrier package, and may be mounted on the TFT array substrate 10 using any of a wire bonding method, a flipchip method, and a beam lead method. In any case, the data line driving circuit 101 and the peripheral circuit are relatively easily tested through the first external circuit connection terminal 102*a* even after the data line driving circuit 101 is mounted.

In the first embodiment, in particular, instead of the peripheral circuit composed of the sampling circuit 118 and the scanning line driving circuit 104, a sampling circuit 118 and a scanning line driving circuit 104 may be mounted as a separate IC. In this arrangement, the function of the driving circuit required of the TFT array substrate 10 is split between two separate ICs, and the flexibility of design is increased. The TFT array substrate 10 may be a glass substrate, a quartz substrate, or a tape substrate, and the external IC may be mounted using a TAB (Tape Automated Bonding). This arrangement still provides the advantage that the data line driving circuit 101 is tested from outside through the first external circuit connection terminal 102*a* without the need for detaching the data line driving circuit 101 formed of an IC external to the substrate assembly.

In the first embodiment, a plurality of output terminals 221 and a plurality of input terminals 222 of the COG type IC forming the data line driving circuit 101 are arranged in a zigzag fashion within the mounting surface of the COG type IC. As seen from FIG. 1 and FIG. 2, the second wirings 202 and the third wirings 203, respectively, linearly extend from the interconnection pads 211 and 212 which respectively correspond to the output terminals 221 and the input terminals 222. The second wiring 202 alternates with the third wiring 203, and the first external circuit connection terminal 102*a* alternates with the second external circuit connection terminal 102*b*. This arrangement efficiently prevents the wirings from overlapping one next to the other side by side while also preventing the external circuit connection terminals from overlapping one next to the other side by side.

With reference to a modification illustrated in FIG. 4, a plurality of output terminals 221 may be respectively in alignment with a plurality of input terminals 222, in the COG type IC forming the data line driving circuit 101. In this case, the interconnection pads 211' are also respectively in alignment with the interconnection pad 212', and each second wiring 202' extending from the corresponding interconnection pad 211' is routed in a trace pattern that evades the interconnection pad 212' and the third wiring 203.

With reference to a modification illustrated in FIG. 5, first external circuit connection terminals 102*a*' and second external circuit connection terminals 102*b*' may be alternately aligned in a line along the edge of the TFT array substrate 10. As long as the pitch of the first external circuit connection terminals 102*a*' and the second external circuit connection terminals 102*b*' is sufficiently large, these terminals are aligned in a line so that the connection of an external circuit to these terminals is easily established.

Figure 6:
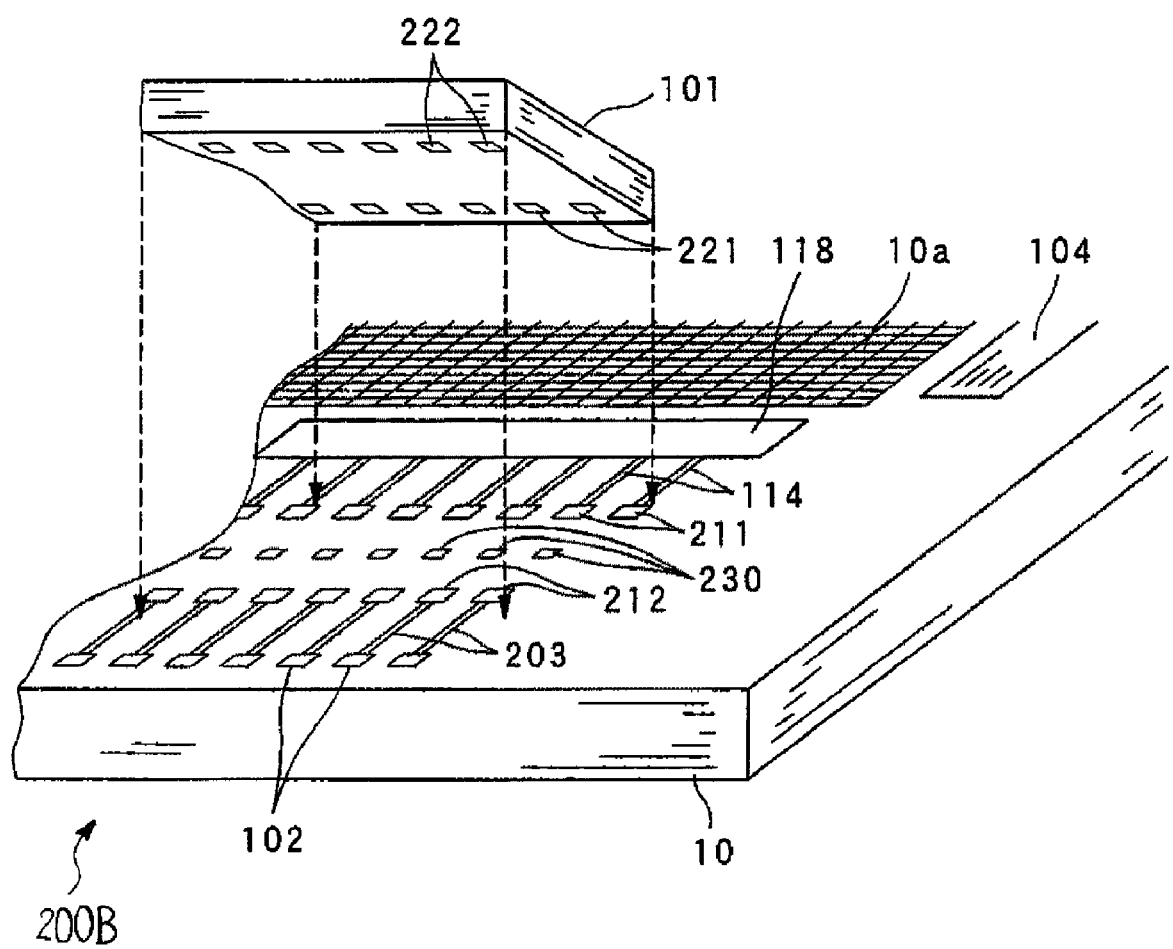
FIG. 6 is a perspective view three-dimensionally illustrating a portion of an external IC and its associated components in accordance with the second embodiment of the substrate assembly of the present invention.

A second embodiment of the substrate assembly of the present invention is discussed below with reference to FIG. 6 through FIG. 9. FIG. 6 is an exploded perspective view three-dimensionally illustrating an external IC and the associated components thereof in the second embodiment of the substrate assembly, FIG. 7 is a plan view partially illustrating the area of the substrate assembly where the external IC is mounted, FIG. 8 is a cross-sectional view of the substrate assembly taken along line C1-C1' in FIG. 6, and FIG. 9 is a process diagram illustrating the manufacturing process of the substrate assembly in a cross section D-D' in FIG. 6.

Figure 7:
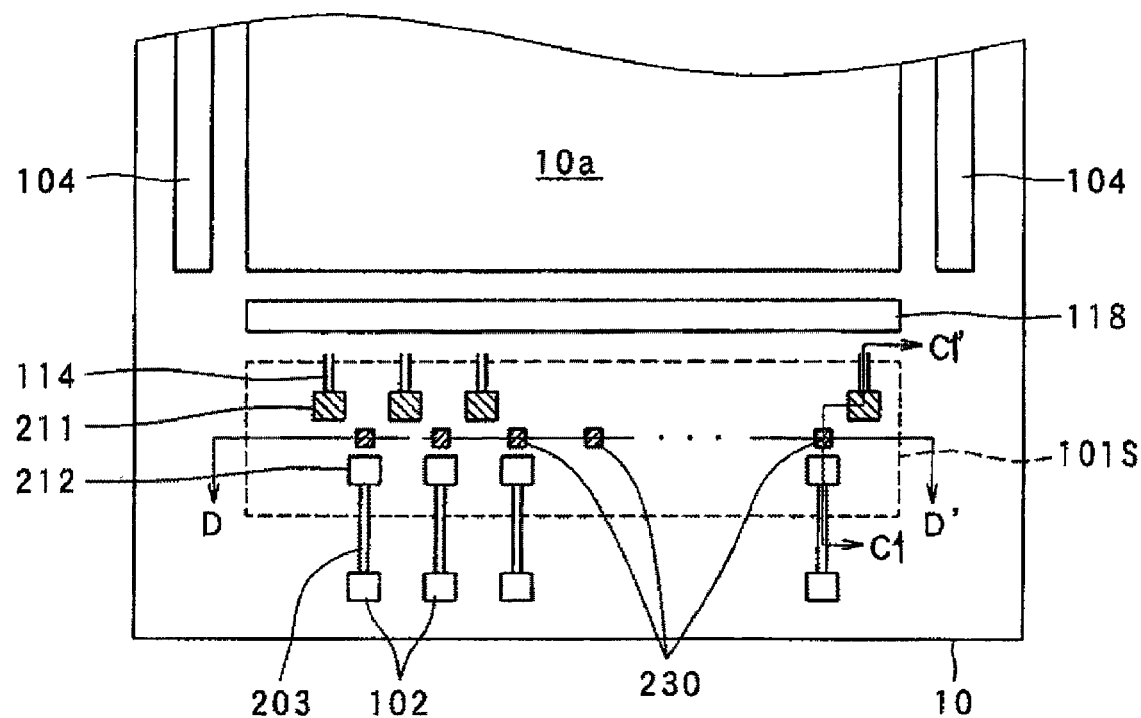
FIG. 7 is a plan view of a portion of the substrate assembly where the external IC is to be mounted in accordance with the second embodiment of the substrate assembly of the present invention.
Figure 8:
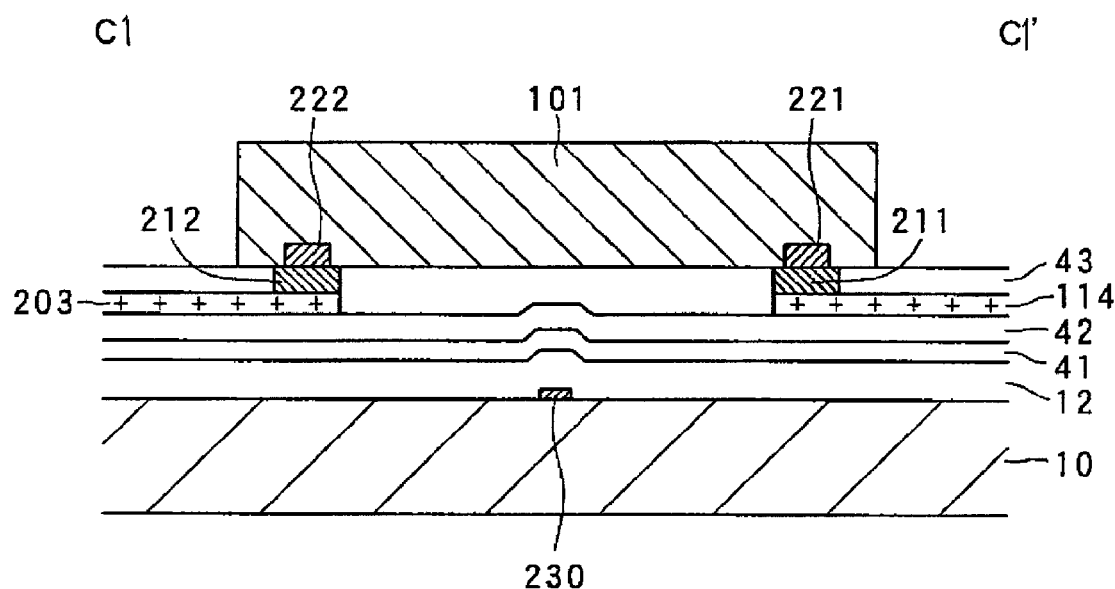
FIG. 8 is a cross-sectional view of the substrate assembly taken along line C1-C1' in FIG. 7.
Figure 9:
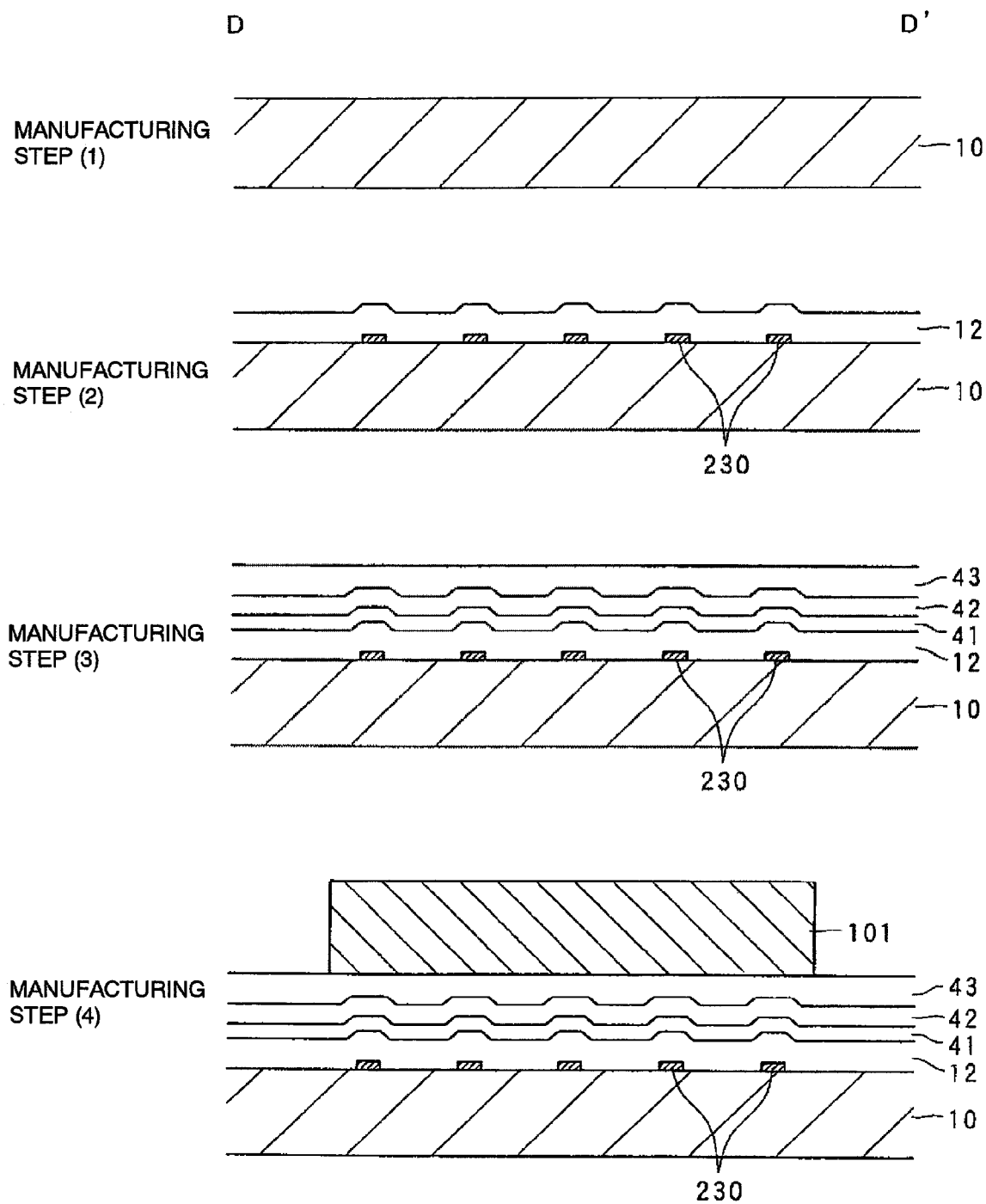
FIG. 9 is a process diagram illustrating manufacturing steps in a cross section taken along line D-D' in FIG. 7.

With reference to FIG. 6 through FIG. 8, and a manufacturing step (4) in FIG. 9, the substrate assembly 200B of the second embodiment can include a TFT array substrate 10. A scanning line driving circuit 104 and a sampling circuit 118 are embedded as one example of the peripheral circuit in the TFT array substrate 10. An interconnection pad 211 is attached to the end of each sampling-circuit driving signal line 114 arranged on the TFT array substrate 10 within an area 101S (see FIG. 7) on which the data line driving circuit 101 is mounted. Within the area 101S on which the data line driving circuit 101 is mounted, an interconnection pad 212 is attached to the end of each third wiring 203 extending from an external circuit connection terminal 102.

The data line driving circuit 101 mounted on the TFT array substrate 10 is formed of an COG type IC having output terminals 221 and input terminals 222. The data line driving circuit 101 is then mounted within the area 101S in such a manner that the output terminals 221 are respectively connected to the interconnection pads 211 and that the input terminals 222 are respectively connected to the interconnection pads 212.

Each of the scanning line driving circuit 104 and the sampling circuit 118 includes high-temperature polysilicon TFTs or low-temperature polysilicon TFTs manufactured in the same manufacturing process as that of pixel switching TFTs which are embedded in the image display area 10*a* as will be described below. The scanning line driving circuit 104 and the sampling circuit 118 are thus embedded in the TFT array substrate 10 as a peripheral circuit.

In accordance with the second embodiment, trace patterns 230 for testing, evaluating, and monitoring the manufacturing process or for evaluating elements are formed and come beneath the data line driving circuit 101. The trace patterns 230 are arranged to be optically or visibly read. Using the trace patterns 230, the manufacturing process is evaluated, tested, or monitored or the element is evaluated until a manufacturing step immediately prior to a manufacturing step of mounting the data line driving circuit 101. In the second embodiment, the trace patterns 230 are no longer used after the data line driving circuit 101 is mounted. Referring to FIG. 6 and FIG. 7, accordingly, the trace patterns 230 are formed within a major portion of the area 101S on which the data line driving circuit 101 is mounted. Specifically, although the trace patterns 230 are hidden beneath the package body of the data line driving circuit 101, no problem is presented, because the trace patterns 230 have already finished the function thereof for evaluating, testing, and monitoring the manufacturing process or for evaluating the element.

In accordance with the second embodiment, the data line driving circuit 101 overlaps the trace patterns 230 so that the area occupied by these two components is narrowed accordingly. In this arrangement, thus, the peripheral area of the TFT array substrate 10 is narrowed while the image display area 10*a* is relatively expanded. A compact electrooptical device with a large screen thus results.

In the second embodiment, referring to FIG. 8 and the manufacturing step (4) in FIG. 9, an underlayer insulator 12, a first interlayer insulator 41, a second interlayer insulator 42, and a third interlayer insulator 43 are laminated below the data line driving circuit 101 as in an interlayer insulator structure in an image display area to be discussed later. Furthermore, the trace patterns 230 are fabricated of islands sandwiched between interlayer insulators, and these conductive films sandwiched between the interlayer insulators form the sampling-circuit driving signal line 114 and the wiring 203. The pattern and the wiring are preferably formed of the same film as the conductive film forming the wiring and the TFT within the image display area. In this arrangement, the manufacturing process and the laminate structure in the TFT array substrate 10 are simplified.

Referring to FIG. 8 and the manufacturing step (4) in FIG. 9, the trace patterns 230 are formed between the TFT array substrate 10 and the underlayer insulator 12. However, it should be understood that the trace patterns 230 are set at any laminar position. For example, the trace patterns 230 may be set between the first interlayer insulator 41 and the second interlayer insulator 42, or between the second interlayer insulator 42 and the third interlayer insulator 43 depending on the purpose of the trace patterns 230, such as for testing, evaluating, and monitoring the manufacturing process or for evaluating the element.

With reference to FIG. 8 and the manufacturing step (4) in FIG. 9, in the second embodiment, the top surface of the third interlayer insulator 43 serving as the mounting surface of the data line driving circuit 101 formed of the COG type IC is planarized by forming a planarized layer through a CMP process or a spin coating process. Even with the data line driving circuit 101 mounted by area on the trace patterns 230, accordingly, the data line driving circuit 101 is free from the surface irregularity of the mounting surface, and remains stable.

The manufacturing method of the electrooptical device of the second embodiment thus constructed is discussed with reference to FIG. 9.

An insulator substrate such as a glass substrate or a quartz substrate is prepared as the TFT array substrate 10 in a manufacturing step (1) in FIG. 9.

In a manufacturing step (2), the trace patterns 230 are formed on the TFT array substrate 10. For example, the trace patterns 230 are produced by forming a refractory metal layer through a sputtering process, and then by patterning the refractory metal layer through photolithographic and etching processes. The underlayer insulator 12 is then deposited on the trace patterns 230.

In a manufacturing step (3), a data line 6a, a scanning line 3a, a TFT 30, etc. having the following structure are produced from a variety of semiconductor layers and electrically conductive layers within the image display area. To isolate one layer from another, the first interlayer insulator 41, the second interlayer insulator 42, and the third interlayer insulator 43 are successively deposited. The third interlayer insulator 43 is then planarized by the CMP process. Alternatively, the third interlayer insulator 43 can be planarized by a spin coating process.

In the manufacturing steps (2) and (3) in the second embodiment, the trace patterns 230 are used to test, evaluate, and monitor the data line 6a, the scanning line 3a, and the TFT 30 having the structure described below in terms of the position and spacing thereof when these elements are formed. The trace patterns 230 are used to test, evaluate, and monitor a variation in the thickness of each electrically conductive layer and each insulator layer, or to evaluate an element forming the image display area or a peripheral circuit.

In the manufacturing step (4), the data line driving circuit 101 is mounted within the area 101S subsequent to the test, evaluation, and monitoring of the manufacturing process and the evaluation of the element through the trace patterns 230.

Through the manufacturing process, the area 101S on which the data line driving circuit 101 is mounted serves as an area on which the trace patterns 230 are formed at one time and serves as an area on which the data line driving circuit 101 is mounted at the other time.

As discussed above, in the electrooptical device of the second embodiment, one portion of the function required of the circuit of the TFT array substrate 10 is shouldered by the sampling circuit 118 and the scanning line driving circuit 104 as the peripheral circuit, and the other portion of the function of the circuit of the TFT array substrate 10 is shouldered by the data line driving circuit 101 as the external IC. The area 101S on which the data line driving circuit 101 is mounted is also used as the formation area of the trace patterns 230. The limited area of the substrate is efficiently used, and the image display area is thus expanded.

Figure 10:
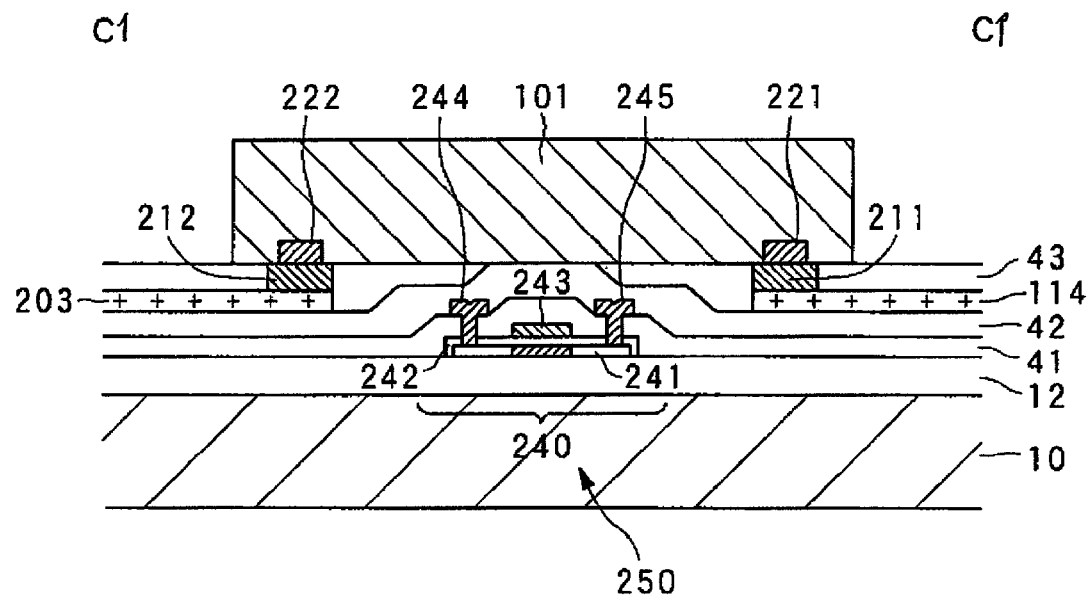
FIG. 10 is a cross-sectional view of a modification of the substrate assembly taken along line C1-C1' in FIG. 7.

A modification of the second embodiment is discussed with reference to FIG. 10. FIG. 10 is a cross-sectional view of the substrate assembly taken along line C1-C1' in FIG. 7.

Referring to FIG. 10, a peripheral circuit 250 including a TFT 240, instead of the trace patterns 230, is produced beneath the data line driving circuit 101 formed of a COG type IC. The TFT 240 includes a semiconductor layer 241, a gate insulator 242, a gate electrode 243, a source electrode 244, and a drain electrode 245. The TFT 240 is preferably fabricated of the same layer as that of the TFT 30 in the same manufacturing process as that of the TFT 30 in the image display area 10a. The peripheral circuit 250 may be a portion of a driving circuit, such as the sampling circuit 118 or the scanning line driving circuit 104, or may be a test circuit. The rest of the construction of the modification remains unchanged from that of the second embodiment.

In accordance with this modification, the data line driving circuit 101 manufactured as an external IC outperforms, in switching performance and low power consumption feature, the data line driving circuit 101 which is formed of the peripheral circuit that can be embedded in the same manufacturing process as that of the TFT 30 in the image display area 10a with the low-temperature polysilicon or the high-temperature polysilicon used as the semiconductor layer. Arranged below the data line driving circuit 101 is the peripheral circuit 250, such as a portion of the driving circuit or the test circuit, modestly excellent in switching performance and power consumption. The driving circuit and the peripheral circuit, each having efficient and high overall performance, can be produced on the TFT array substrate 10. The image display area 10a can be also relatively expanded.

The peripheral circuit 250 may be formed in an area other than the areas of the interconnection pads 211, the interconnection pad 212, the third wirings 203, and the sampling-circuit driving signal lines 114. Alternatively, the peripheral circuit 250 may at least underlap any of the interconnection pad and the wiring with an insulator layer arranged therebetween.

The peripheral circuit 250 may be a dedicated test circuit for testing the manufacturing process prior to the mounting of the data line driving circuit 101, or may be a dedicated test circuit for testing the manufacturing process regardless of whether it is before or after the mounting of the data line driving circuit 101.

In the above second embodiment and the modification thereof, rather than in the COG type IC, the data line driving circuit 101 may be formed in any of a variety of packages, such as a DIP package, a flatpack package, a chip carrier package, and the like. Further, the data line driving circuit 101 may be mounted on the TFT array substrate 10 using any of a wire bonding method, a flipchip method, and a beam lead method. In any case, space saving is promoted by placing the trace patterns 230 or the peripheral circuit 250 on the same area as that of the data line driving circuit 101.

In the second embodiment and the modification thereof, instead of the peripheral circuit composed of the sampling circuit 118 and the scanning line driving circuit 104, a sampling circuit 118 and a scanning line driving circuit 104 may be mounted as a separate IC. In this arrangement, the function of the driving circuit required of the TFT array substrate 10 is split between two separate ICs, and the flexibility of design is increased. The TFT array substrate 10 may be a glass substrate, a quartz substrate, or a tape substrate, and the external IC may be mounted using a TAB (Tape Automated Bonding). This arrangement still provides the advantage that space saving is promoted by placing the trace patterns 230 or the peripheral circuit 250 on the same area as that of the data line driving circuit 101.

Figure 11:
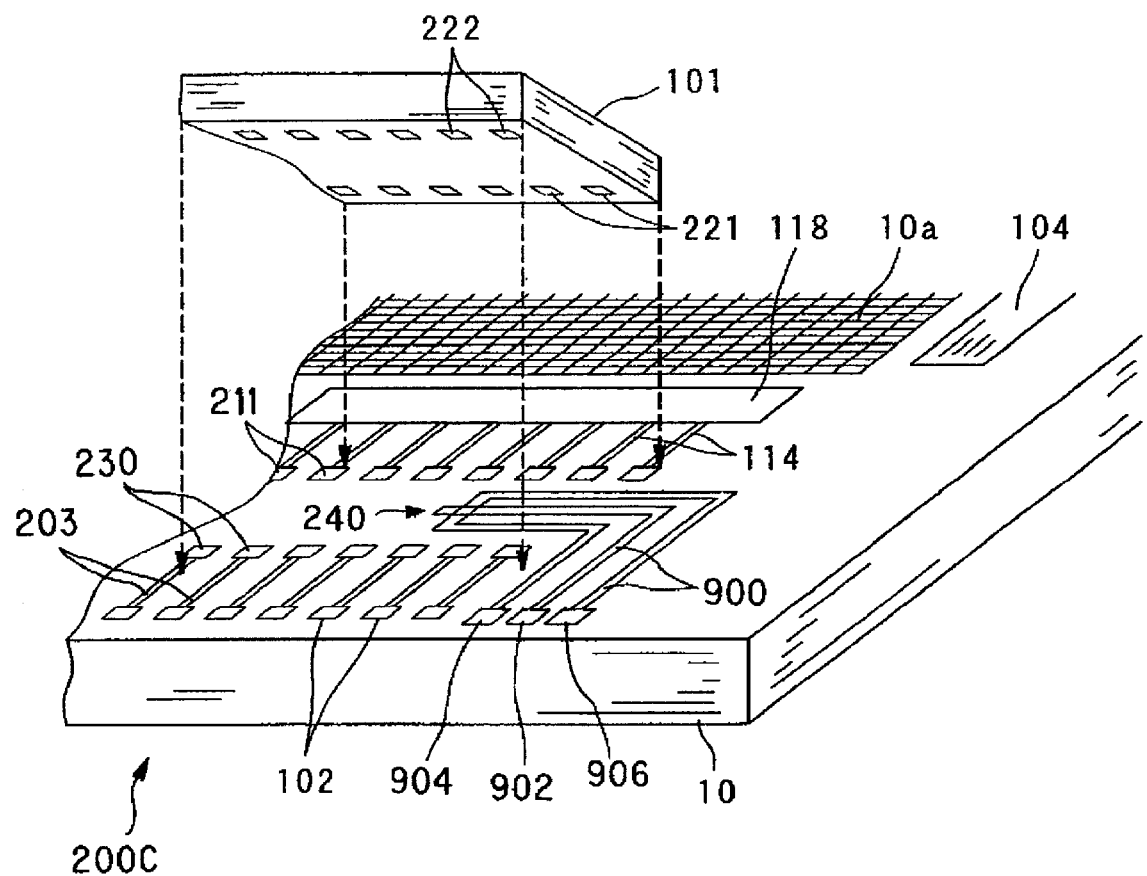
FIG. 11 is a perspective view three-dimensionally illustrating a portion of an external IC and its associated components in accordance with the third embodiment of the substrate assembly of the present invention.

A third embodiment of the substrate assembly of the present invention is discussed with reference to FIG. 11 through FIG. 13. FIG. 11 is an exploded perspective view three-dimensionally illustrating an external IC and the associated components thereof in the third embodiment of the substrate assembly of the present invention, FIG. 12 is a plan view partially illustrating the area of the substrate assembly where the external IC is mounted, and FIG. 13 is a cross-sectional view of the substrate assembly taken along line C2-C2' in FIG. 12.

The third embodiment is an application of the TFT array substrate 10 in each of the first and second embodiments. The third embodiment is similar in construction to each of the first and second embodiments. Elements in FIG. 11 through FIG. 13 identical to those described with reference up to FIG. 10 are designated with the same reference numerals, and the discussion thereof is only briefly made or omitted. In other words, the third embodiment will be discussed focussing on the construction unique thereto.

Figure 12:
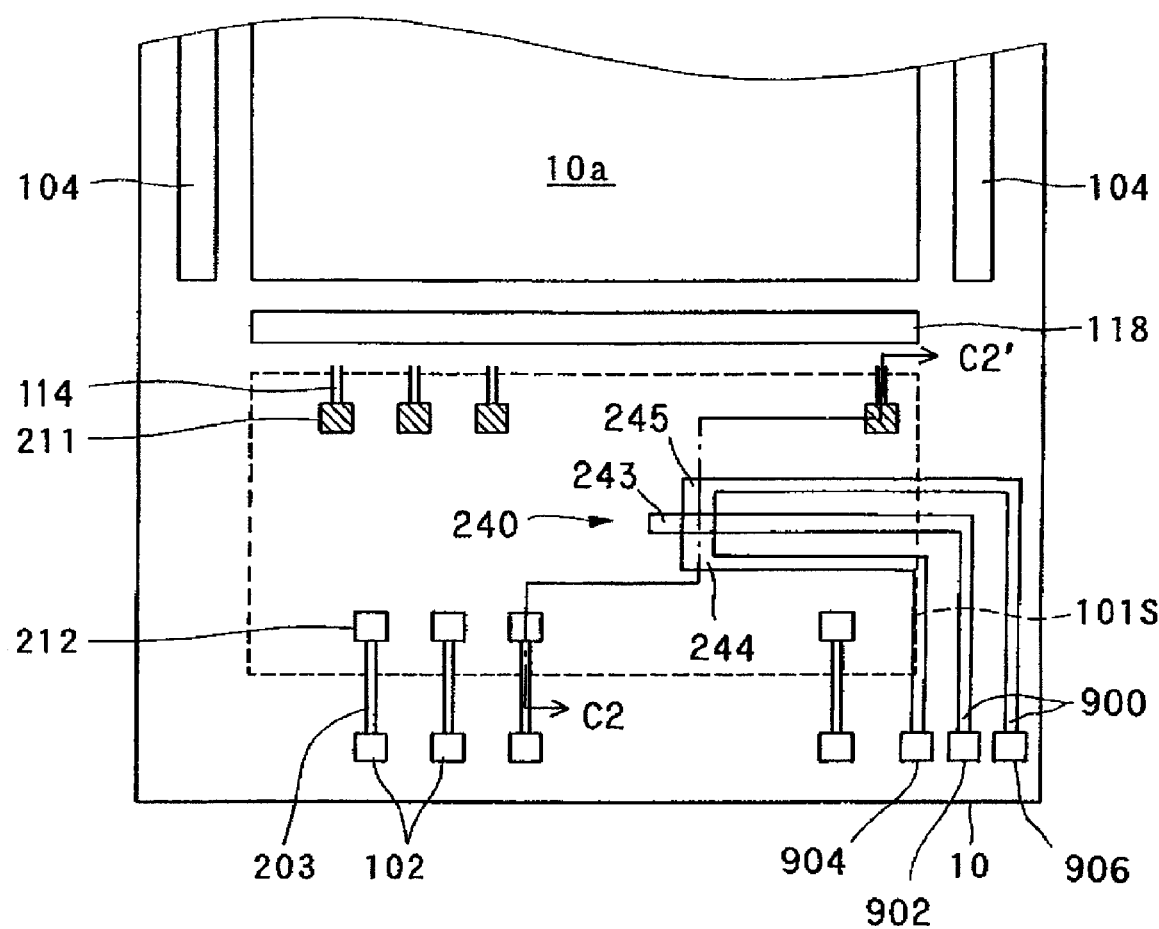
FIG. 12 is a plan view of a portion of the substrate assembly where the external IC is to be mounted in accordance with the third embodiment of the substrate assembly of the present invention.
Figure 13:
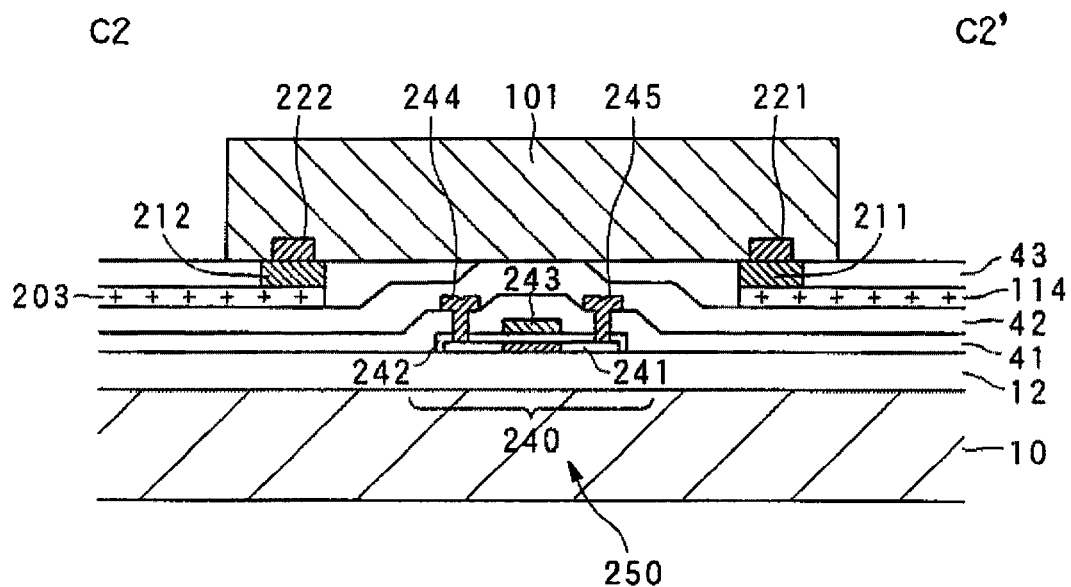
FIG. 13 is a cross-sectional view of the substrate assembly taken along line C2-C2' in FIG. 12.

A substrate assembly 200C of the third embodiment includes a TFT array substrate 10 as illustrated in FIG. 11 through FIG. 13. A peripheral circuit 250 including a TFT 240 is arranged on the TFT array substrate 10 within an area 101S on which the data line driving circuit 101 is mounted and below the data line driving circuit 101. The TFT 240 includes a semiconductor layer 241, a gate insulator 242, a gate electrode 243, a source electrode 244, and a drain electrode 245. The TFT 240 is preferably fabricated of the same layer as that of the TFT 30 in the same manufacturing process as that of the TFT 30 in the TFT array substrate 10a.

As in the second embodiment, the data line driving circuit 101 manufactured as an external IC in the third embodiment outperforms, in switching performance and low power consumption feature, the data line driving circuit 101 which is formed of the peripheral circuit that is embedded in the same manufacturing process as that of the TFT 30 in the image display area 10a with the low-temperature polysilicon or the high-temperature polysilicon used as the semiconductor layer. Arranged below the data line driving circuit 101 is the peripheral circuit 250, such as a portion of the driving circuit or the test circuit, modestly excellent in switching performance and power consumption. The driving circuit and the peripheral circuit, each having efficient and high overall performance, are produced on the TFT array substrate 10. The image display area 10a is also relatively expanded.

In the third embodiment, ends of lead lines 900 are respectively connected to the gate electrode 242, the source electrode 244, and the drain electrode 245 forming the TFT 240. TFT terminals 902, 904, and 906, as example of external circuit connection terminals for the bottom circuit stated in the discussion of the present invention, are formed on the TFT array substrate 10 in a way similar to the way in which the external circuit connection terminals 102 are arranged in the substrate assembly 200A in the first embodiment. The other ends of the lead lines 900 are respectively connected to the TFT terminals 902, 904, and 906.

In the substrate assembly 200C of the third embodiment, the TFT 240 is embedded below the data line driving circuit 101 while the gate electrode 242, the source electrode 244, and the drain electrode 245 of the TFT 240 are respectively controlled from outside through the TFT terminals 902, 904, and 906. In accordance with the third embodiment, the TFT 240 is effectively used even after the data line driving circuit 101 is mounted. For example, when the TFT 240 forms a portion of a test circuit, the operation test of the substrate assembly 200C or the peripheral circuit 250 may be carried out during maintenance in the middle of use after the shipment.

In accordance with the third embodiment, the above-mentioned lead lines and the external circuit connection terminals for the bottom circuit are arranged for circuit elements, such as the TFT 240 contained in the peripheral circuit 250. The workload on the substrate assembly 200C is flexibly shared between the data line driving circuit 101 as the external IC and the peripheral circuit 250, and the flexibility of design of the substrate assembly is heightened.

The construction of the third embodiment has been discussed by way of example only. For example, the lead lines are connected to all electrodes of the TFT 240, and the TFT terminals 902, 904, and 906 are respectively connected to these lead lines. However, it should be understood that the present invention is not limited to this embodiment. The lead lines and the external circuit connection terminals for the bottom circuit are arranged for only the electrodes which need to be controlled from outside. Broadly, the circuit element the lead line is connected to is not limited to the TFT. The circuit element may be a thin-film diode, a capacitor, or other element without departing from the spirit and scope of the present invention.

The first, second, and third embodiments have been discussed focusing on the respective features thereof. However, it should be understood that the present invention is not limited to these specific embodiments. An electrooptical device having the features of the first and second embodiments in combination, an electrooptical device having the features of the second and third embodiments in combination, and an electrooptical device having the features of the first and third embodiments in combination fall within the scope of the present invention. An electrooptical device having all features of the first, second, and third embodiments also falls within the scope of the present invention.

One embodiment of the electrooptical device of the present invention is discussed with reference to FIG. 14 through FIG. 18. The electrooptical device of this embodiment is a liquid-crystal device having the aforementioned substrate assembly 200 on a TFT array substrate.

Figure 14:
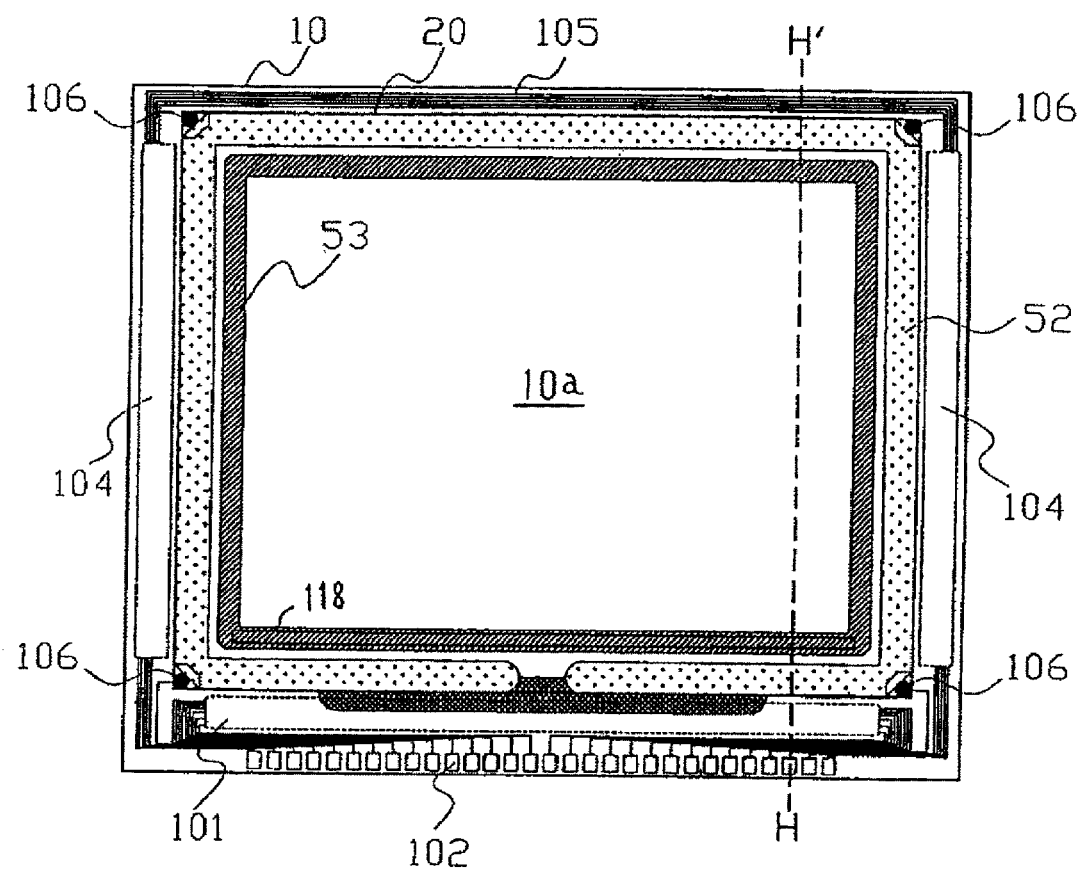
FIG. 14 is a plan view of the TFT array substrate with components mounted thereon, in the electrooptical device of the embodiment of the present invention viewed from the counter substrate.

The general construction of the electrooptical device of this embodiment is discussed with reference to FIG. 14 and FIG. 15. Discussed here as an example of the electrooptical device is a TFT active matrix liquid-crystal device having a built-in driving circuit. FIG. 14 is a plan view of the TFT array substrate with components mounted thereon, viewed from a counter substrate, and FIG. 15 is a cross-sectional view of the TFT array substrate taken along line H-H' in FIG. 14.

Figure 15:
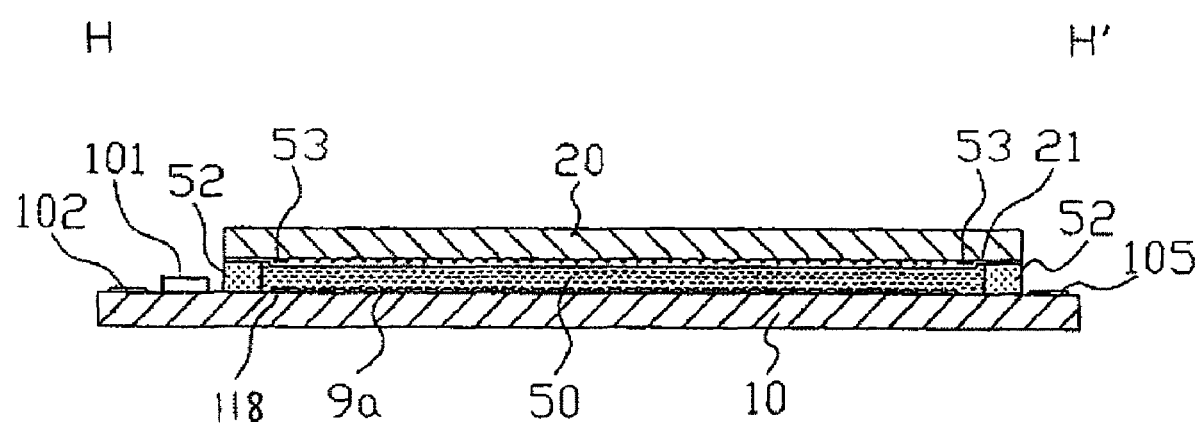
FIG. 15 is a cross-sectional view of the TFT array substrate taken along line H-H' in FIG. 14.

Referring to FIG. 14 and FIG. 15, the electrooptical device of this embodiment includes a TFT array substrate 10 and a counter substrate 20. A liquid-crystal layer 50 is encapsulated between the TFT array substrate 10 and the counter substrate 20, and the TFT array substrate 10 and the counter substrate 20 are bonded to each other with a sealing member 52 arranged in a sealing area surrounding an image display area 10a. To bond the two substrates, the sealing member 52 may be fabricated of a thermosetting resin, a photo-thermo-setting resin, a photo-setting resin, an ultraviolet curing resin, or the like, and is applied on the TFT array substrate 10 during the manufacturing process, and is then set by a heating, a heating and light irradiation process, a light irradiation process, an ultraviolet irradiation process, or the like.

A gap material, such as of glassfiber or glass beads, is contained in the sealing member 52 to keep the spacing between the two substrates (a substrate gap) to a predetermined value. The electrooptical device of this embodiment is appropriate for use as a light valve for a projector which is compact and displays an expanded image. If the electrooptical device is a liquid-crystal device, such as a liquid-crystal display or a liquid-crystal television, which is large and presents unmagnified images, such a gap material may be contained in the liquid-crystal layer 50.

Intersubstrate connection materials 106, arranged at the four corners of the counter substrate 20, establish electrical connection between intersubstrate connection terminals arranged on the TFT array substrate 10 and a substrate electrode 21 of the counter substrate 20.

Referring to FIGS. 14 and 15, a light-shield frame outline 53, defining the image display area 10a and arranged inside and along the sealing area of the sealing member 52, is mounted on the counter substrate 20. Alternatively, the light-shield frame outline 53 may be mounted on the TFT array substrate 10. The data line driving circuit 101 and the external circuit connection terminals 102 are arranged along one side of the TFT array substrate 10, on an exterior portion outside the sealing area of the sealing member 52 in the peripheral area surrounding the image display area, and the scanning line driving circuits 104 are arranged along two sides of the TFT array substrate 10 perpendicular to the one side. A plurality of wirings 105 for connecting the scanning line driving circuits 104 arranged on both sides of the image display area 10a are arranged on the remaining one side of the TFT array substrate 10.

Referring to FIG. 15, the TFT array substrate 10 includes an alignment layer which is formed on pixel electrodes 9a on which the scanning lines for switching pixel TFTs and the wirings for the data lines have been formed. The counter substrate 20 includes the counter electrode 21 and an alignment layer as a top layer thereof. The liquid-crystal layer 50 is a liquid crystal formed of one or several types of nematic liquid crystals in combination, and takes a predetermined alignment state between the pair of alignment layers.

In this embodiment, the sampling circuit 118 is arranged beneath the light-shield frame outline 53 on the TFT array substrate 10. In response to a sampling-circuit driving signal supplied from the data line driving circuit 101, the sampling circuit 118 samples a video signal on a video signal line and feeds the sampled video signal to the data line.

In this embodiment, the data line driving circuit 101 is formed of the COG type IC, and is attached to the TFT array substrate 10. In contrast, the scanning line driving circuit 104 and the sampling circuit 118 are embedded in the TFT array substrate 10, and contain the TFTs which are manufactured in the same manufacturing process as that of the pixel switching TFTs, one arranged for each pixel within the image display area as will be discussed in greater detail below.

Figure 16:
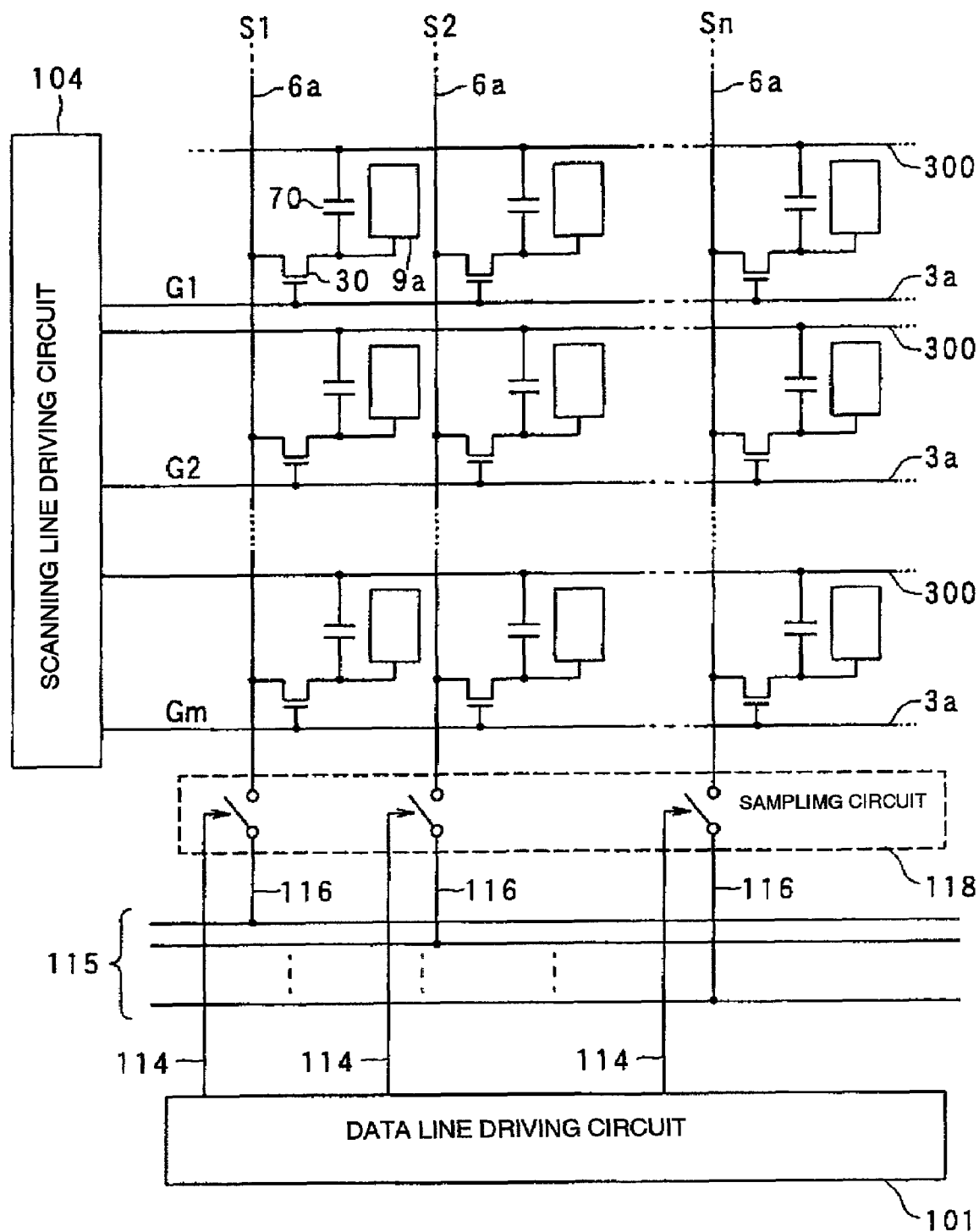
FIG. 16 is an equivalent circuit diagram of a variety of devices in a matrix of pixels forming the image display area of the electrooptical device, and wirings in the electrooptical device of the embodiment of the present invention.

The circuit arrangement and operation of the electrooptical device thus constructed are discussed with reference to FIG. 16. FIG. 16 is a block diagram of an equivalent circuit diagram of a variety of elements in a matrix of pixels forming the image display area of the electrooptical device, wirings, and a peripheral circuit.

Referring to FIG. 16, the pixel electrode 9a and the TFT 30 for switching-controlling the pixel electrode 9a are formed in each of the pixels in a matrix forming the image display area of the electrooptical device of this embodiment, and the data line 6a supplied with the video signal is electrically connected to the source of the TFT 30.

One end of the data line 6a (the lower end thereof in FIG. 16) is connected to the drain of each switching device, such as a TFT in the sampling circuit 118, within the peripheral area surrounding the image display area 10a. A video signal line 115 is connected the source of the TFT in the sampling circuit 118 through a lead line 116. The sampling-circuit driving signal line 114 connected to the data line driving circuit 101 is connected to the gate of the TFT in the sampling circuit 118. The sampling circuit 118 samples video signals S1, S2, . . . , Sn on the video signal lines 115 and feeds the sampled video signals S1, S2, . . . , Sn to the data lines 6a in response to the sampling circuit driving signals supplied through the sampling circuit driving signal line 114 from the data line driving circuit 101.

The video signals S1, S2, . . . , Sn to be written on the data lines 6a maybe supplied in that order, or may be supplied to a group of adjacent lines 6a at a time.

Scanning lines 3a are respectively electrically connected to the gates of the TFTs 30 and are supplied with scanning signal G1, G2, . . . , Gm in the form of pulse at a predetermined timing in a one-line-at-a-time manner in that order by the scanning line driving circuit 104. Pixel electrodes 9a are respectively electrically connected to the drains of the TFTs 30, and the video signals S1, S2, . . . , Sn fed through the data lines 6a are written at a predetermined timing by closing the TFTs 30, as a switching element, for a predetermined duration of time. The video signals S1, S2, . . . , Sn at a predetermined level, which are written on a liquid crystal through the pixel electrodes 9a, are stored in the liquid crystal as one example of the electrooptical device with the counter electrode 21 formed on the counter substrate for a predetermined duration of time. The liquid crystal modulates light to present it in a gradation by varying the orientation or the order of the collection of molecules. In a normally white mode, light transmittance to incident light is reduced depending on a voltage applied on each pixel, while in a normally black mode, the light transmittance to the incident light is increased depending on a voltage applied on each pixel, and as a result, the liquid-crystal display device outputs light bearing a contrast generally responsive to the video signal. To prevent the stored video signal from leaking, a storage capacitor 70 is added in parallel with the capacitor of the liquid crystal formed between the pixel electrode 9a and the counter electrode 21.

Besides the scanning line driving circuit 104 and the sampling circuit 118, the TFT array substrate 10 may be provided with a precharge circuit for supplying a precharge signal at a predetermined voltage level to the plurality of the data lines 6a prior to the application of the video signal, and a test circuit for checking the quality and defects of the electrooptical device in the middle of the production or at the shipment thereof.

A variety of these circuits may be embedded as a peripheral circuit in each of the substrate assemblies 200A, 200B, and 200C respectively illustrated in FIG. 1, FIG. 6, and FIG. 11, or may be manufactured as an external IC and then may be mounted on each of these substrates.

Specifically, the peripheral circuit, such as the aforementioned precharge circuit and test circuit, may be embedded in the TFT array substrate 10 in addition to or instead of the scanning line driving circuit 104 and the sampling circuit 118. The peripheral circuit such as the aforementioned precharge circuit and the test circuit may be formed as an external IC in addition to or instead of the data line driving circuit 101, and is then attached to the TFT array substrate 10. In this embodiment, any portion of the driving circuit can be formed as an external IC.

Figure 17:
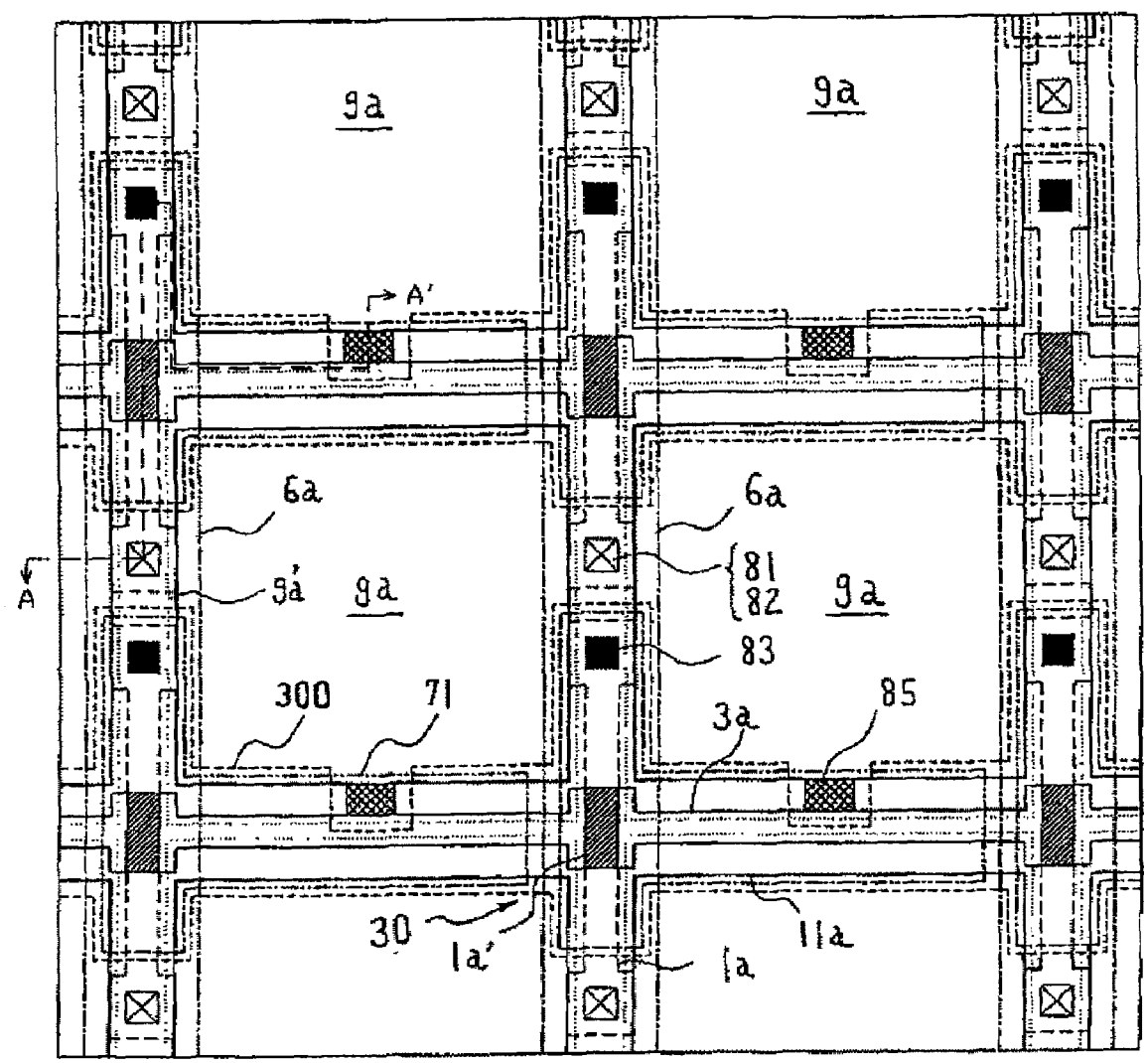
FIG. 17 is a plan view illustrating a plurality of pixels adjacent to each other in the TFT array substrate in the electrooptical device of the embodiment having the data lines, the scanning lines, and the pixel electrodes formed thereof.
Figure 18:
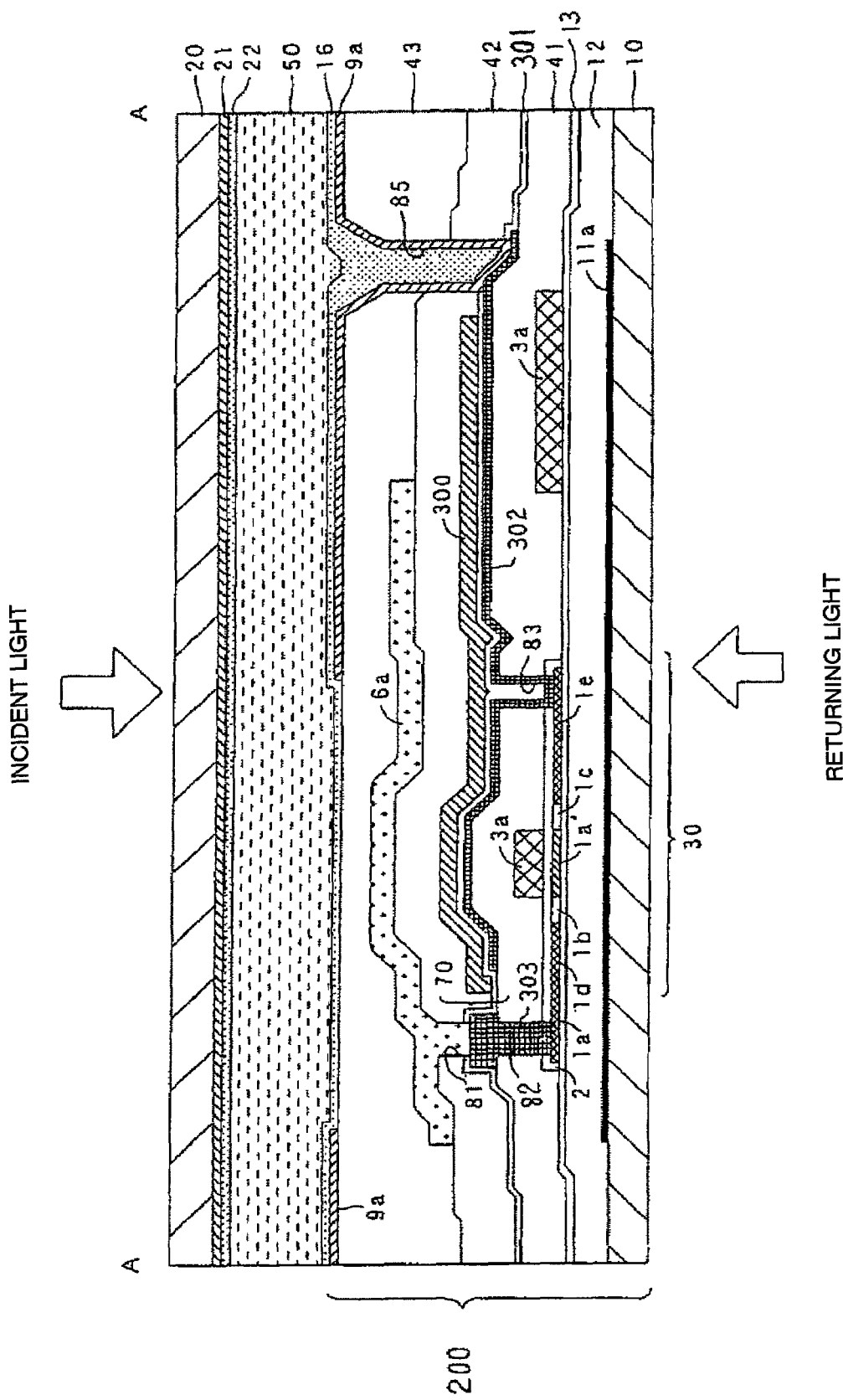
FIG. 18 is a cross-sectional view of the substrate assembly taken along line A-A' in FIG. 17.

Referring to FIG. 17 and FIG. 18, the pixel of the electrooptical device in this embodiment is discussed. FIG. 17 is a plan view illustrating a plurality of pixels adjacent to each other in the electrooptical device in which the data lines, the scanning lines, and the pixel electrodes are formed, and FIG. 18 is a cross-sectional view of the electrooptical device taken along line A-A' in FIG. 17. Referring to FIG. 18, layers and members are drawn to different scales for easy identification.

Referring to FIG. 17, the substrate 10 of the liquid-crystal display device includes a matrix of transparent pixel electrodes 9a (with the outlines thereof represented by broken lines 9a'). The data line 6a, and the scanning line 3a run respectively vertically and horizontally along each pixel electrode 9a.

The scanning line 3a is arranged to face the channel region 1a', of a semiconductor layer 1a, represented by a portion hatched with rightwardly upwardly inclined lines. The scanning line 3a functions as a gate electrode. Arranged at each intersection of the scanning line 3a and the data line 6a in this way is a pixel switching TFT 30 having the channel region 1a' with the scanning line 3a serving as the gate electrode and facing the channel region 1a'.

In this embodiment, a capacitive line 300 is formed overlapping the formation area of the scanning line 3a represented by solid lines. Specifically, the capacitive line 300 has a main line portion extending along the scanning line 3a, a projection portion projecting upwardly along the data line 6a from the intersection of the scanning line 3a and the data line 6a as shown in FIG. 17, and a narrow portion slightly narrowed at the area of a contact hole.

Referring to FIG. 17 and FIG. 18, the pixel electrode 9a is electrically connected to a heavily doped drain region 1e of the semiconductor layer 1a through contact holes 83 an 85 and a drain electrode 302 functioning as an electrically conductive extension layer for interconnection. The data line 6a is connected to a heavily doped source region 1d through contact holes 81 and 82 and a source electrode 303 functioning as an electrically conductive layer for interconnection.

The capacitive line 300 including a fixed-voltage capacitive electrode is formed on a pixel-voltage capacitive electrode formed of a portion of the drain electrode 302 with a dielectric layer 301 sandwiched between the capacitive line 300 and the drain electrode 302. The capacitive line 300 can be fabricated of a metal, an alloy, a metal silicide, or a polycide of one selected from the group consisting of Al (aluminum), Ag (silver), Cu (copper), Ti (titanium), Cr (chromium), W (tungsten), Ta (tantalum), Mo (molybdenum), Pb (lead), or is fabricated of a laminate of the metal, a laminate of the alloy, a laminate of the metal silicide, or a laminate of the polycide. In this embodiment, a storage capacitor 70 is formed by sandwiching the dielectric layer 301 between a portion of the drain electrode 302 and a portion of the capacitive line 300.

The second interlayer insulator 42, formed on the capacitive line 300, has the contact hole 81 connecting the source electrode 303 to the data line 6a and the contact hole 85 connecting the drain electrode 302 to the pixel electrode 9a. The second interlayer insulator 42 is fabricated of a silicate glass layer, a silicon nitride layer, or a silicon oxide layer, for example, and has a thickness falling within a range from about 500 to 2000 nm.

The data line 6a is produced on the second interlayer insulator 42, and the third interlayer insulator 43 having the contact hole 85 leading to the drain electrode 302 is deposited on the data line 6a and the second interlayer insulator 42. The data line 6a, fabricated of a low-resistance metal layer such as Al (aluminum), is produced in a predetermined trace pattern using a sputtering technique, a photolithographic technique, and an etching technique. The thickness of the data line 6a may be several hundred nm so that sufficient conductivity results in accordance with a line width. On the other hand, the third interlayer insulator 43 can be fabricated of a silicate glass layer, a silicon nitride layer, or a silicon oxide layer, for example, and the thickness thereof falls within a range of from about 500 to 2000 nm.

The pixel electrode 9a is deposited on top of the third interlayer insulator 43. The pixel electrode 9a is fabricated of an electrically conductive, transparent layer such as an ITO (Indium Tin Oxide) layer using a sputtering technique, a photolithographic technique, or an etching technique. As in an electrooptical device to be discussed later, an alignment layer subjected to a rubbing process may be used.

The data line 6a is electrically connected to the heavily doped source region 1d of the semiconductor layer 1a through the contact hole 81, the contact hole 82 and through the source electrode 303 as a conductive extension layer. The pixel electrode 9a is electrically connected to the heavily doped drain region 1e of the semiconductor layer 1a through the contact hole 83, the contact hole 85, and through the drain electrode 302 as a conductive extension layer which is manufactured of the same layer as that of the source electrode 303.

Using the drain electrode 302 as the conductive extension layer, even if an interlayer spacing between the pixel electrode 9a and the semiconductor layer 1a forming the TFT 30 is as long as 1000 nm for example, the pixel electrode 9a is connected to the semiconductor layer 1a in an electrically sound fashion through two contact holes 83 and 84 having a relatively small diameter and connected in series in a manner free from the difficulty of connecting the pixel electrode 9a to the semiconductor layer 1a with a single contact hole. Thus, the aperture ratio of the pixel is increased. With the use of such conductive extension layer, etching through is prevented during the opening of the contact hole. Similarly, using the source electrode 303, even if an interlayer spacing between the data line 6a and the semiconductor layer 1a forming the TFT 30 is long, the data line 6a is connected to the semiconductor layer 1a in an electrically sound fashion through the two contact holes 81 and 82 having a relatively small diameter and connected in series in a manner free from the difficulty of connecting the data line 6a to the semiconductor layer 1a with a single contact hole.

Referring to FIG. 17 and FIG. 18, the storage capacitor 70 is formed of the drain electrode 302, the capacitive line 300 and the dielectric layer 301 sandwiched therebetween in an area overlapping the scanning line 3a and in an area overlapping the data line 6a in a plan view.

The capacitive line 300 has a generally comb-like configuration, extending to cover the scanning line 3a and projecting in the projection thereof to cover the drain electrode 302 within the area of the data line 6a. The drain electrode 302 has a generally L-shaped island, capacitive electrode, extending in one segment thereof from the intersection of the scanning line 3a and the data line 6a, along the projection of the capacitive line 300 within the area of the data line 6a, and extending in the other segment to near an adjacent data line 6a along the capacitive line 300 within the area of the scanning line 3a. The storage capacitor 70 is thus formed in the area where the L-shaped drain electrode 302 overlaps the capacitive line 300 with the dielectric layer 301 sandwiched therebetween.

The drain electrode 302 forming one capacitive electrode of the storage capacitor 70 is connected to the pixel electrode 9a through the contact hole 85, while being connected to the heavily doped drain region 1e through the contact hole 83. The drain electrode 302 is thus kept to the pixel electrode voltage.

The capacitive line 300 forming the other electrode of the storage capacitor 70 extends along an image formation area of the pixel electrode 9a, and is electrically connected to a constant-voltage power source to be at a constant voltage. The constant-voltage power source may be a positive power source or a negative power source which feeds power to the scanning line driving circuit to supply the scanning line 3a with the scanning signal for driving the TFT 30, or to the data line driving circuit to control the sampling circuit for supplying the data line 6a with the video signal, or may be a constant voltage source which feeds power to the counter substrate.

The dielectric layer 301 of the storage capacitor 70 maybe a silicon oxide layer, such as an HTO (High Temperature Oxide) layer or an LTO (Low Temperature Oxide) layer, or a silicon nitride layer, each layer having a relatively thin thickness falling within a range from 5 to 200 nm. The dielectric layer 301 may be a thermo-oxide layer obtained by oxidizing the surface of the drain electrode 302. To increase the capacitance of the storage capacitor 70, the thinner the thickness of the dielectric layer 301, the better as long as layer reliability is assured.

Referring to FIG. 18, the electrooptical device includes one of the substrate assemblies 200A, 200B, and 200C, and the transparent counter substrate 20 oppositely placed thereto. The counter substrate 20 is fabricated of a glass substrate or a quartz substrate, for instance. The TFT array substrate 10 is provided with the pixel electrodes 9a, and arranged on top of them is an alignment layer 16 which has been subjected to a predetermined alignment process such as a rubbing process. The alignment layer 16 is fabricated of an organic thin film, such as a polyimide thin film.

The counter substrate 20 has a counter electrode 21 extending on the entire surface thereof, and an alignment layer 22 thereunder that has been subjected to a predetermined alignment process such as a rubbing process. The counter electrode 21 is fabricated of a transparent, electrically conductive film, such as an ITO film. The alignment layer 22 is fabricated of an organic thin film such as a polyimide thin film.

Arranged on the TFT array substrate 10 is a pixel switching TFT 30, adjacent to each pixel electrode 9a, for controlling the pixel electrode 9a.

A light-shield layer may be arranged on the counter substrate 20. The use of the light-shield layer controls the entry of incident light beams from the counter substrate 20 to a channel region 1a', a lightly doped source region 1b, and a lightly doped drain region 1c of the semiconductor layer 1a of the TFT 30. Furthermore, the light-shield layer on the counter substrate may be provided with a highly reflective surface for reflecting the incident light beam, thereby preventing temperature from rising in the electrooptical device.

In this embodiment, the data line 6a fabricated of aluminum having light shield feature may light shield the area along the data line 6a, out of the light shield area of each pixel, or the capacitive line 300 may be fabricated of a light shield layer, thereby light shielding the channel region 1a'.

In this arrangement, a liquid crystal is encapsulated in a gap surrounded by a sealing material between the TFT array substrate 10 and the counter substrate 20 arranged with the pixel electrodes 9a facing the counter electrode 21. A liquid-crystal layer 50 is thus formed. The liquid-crystal layer 50 takes a predetermined orientation state by the alignment layer 16 and the alignment layer 22 with no electric field applied by the pixel electrode 9a.

Although the lamination of several electrically conductive layers forms steps on the area along the data line 6a and the scanning line 3a in the embodiment described above, a planarization process may be performed by grooving a trench in the first interlayer insulator 41 and the second interlayer insulator 42, and by embedding the wiring of the data line 6a and the TFT 30 in the trench. The steps in the third interlayer insulator 43 and the second interlayer insulator 42 may be polished away through a CMP process. Alternatively, an organic SOG may be used to planarize the laminate structure.

In the embodiment described above, the pixel switching TFT 30 preferably has the LDD structure shown in FIG. 18. Alternatively, the pixel switching TFT 30 may have an offset structure in which no impurity ion implantation is performed on the lightly doped source region 1b and the lightly doped drain region 1c, or may have a self-aligned type TFT in which a high dose impurity ion is implanted with part of the gate electrode 3a being used as a mask, to form heavily doped source and drain in a self-alignment process. In this embodiment, the gate electrode of the pixel switching TFT 30 is of a single gate structure in which a single gate electrode is interposed between the heavily doped source region 1d and the heavily doped drain region 1e, but alternatively, more than one gate electrode may be interposed therebetween. With dual gates or triple gates employed in a TFT, leakage currents in junctions between the channel region and the source region and between the channel region and the drain region are prevented, and thereby a current during off period is reduced. The TFTs forming the peripheral circuit may be produced as one of the variety of TFTs.

Arranged on the light incident side of the counter substrate 20 and the light exit side of the TFT array substrate 10 in the embodiments discussed with reference to FIG. 14 through FIG. 18 are respectively polarizer films, retardation films, and polarizers in predetermined directions to work with operation modes such as a TN (Twisted Nematic)

mode, a VA (Vertically Aligned) mode, or a PDLC (Polymer Dispersed Liquid Crystal) mode, and normally white mode/normally black modes.

When the liquid-crystal display of each of the above embodiments is incorporated in a projector, three panels of the electrooptical devices are used as RGB light valves, and each light valve receives the respective color light separated through RGB color separating dichroic mirrors. In each of the above embodiments, the counter substrate 20 is equipped with no color filter. Optionally, an RGB color filter may be arranged in a predetermined area facing the pixel electrode 9a having no light shield layer 23, on the counter substrate 20 along with a protective film. In this way, the electrooptical device of each embodiment finds applications in a direct viewing or reflective type color electrooptical device, besides the electrooptical projector. Microlenses may be arranged on the counter substrate 20 on a one microlens to one pixel basis. A color filter layer may be formed of a color resist beneath the RGB pixel electrodes 9a on the TFT array substrate 10. In this way, condensation efficiency of the incident light is increased, and an electrooptical device providing a bright image results. By laminating interference layers having different refractive indexes on the counter substrate 20, a dichroic filter for creating the RGB colors is formed taking advantage of interference of light. The counter substrate with such a dichroic filter equipped makes an even brighter electrooptical device.

Figure 19:
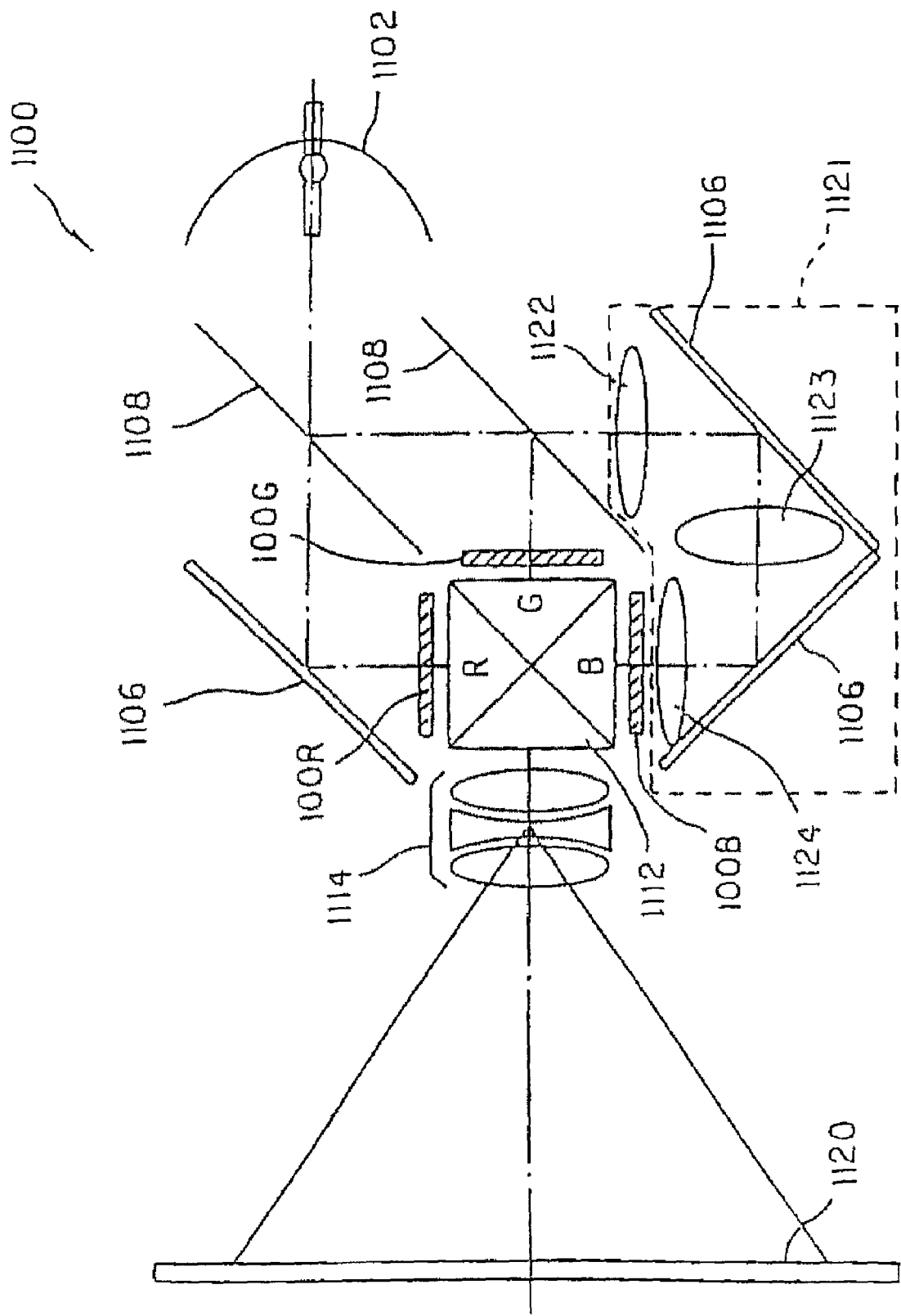
FIG. 19 is a cross-sectional view of a color liquid-crystal projector as one example of projection type color display device in the embodiment of the electronic equipment of the present invention.

FIG. 19 diagrammatically illustrates a projector type color display device, as one example of the electronic apparatus, which uses the above-referenced electrooptical device as a light valve. The general construction of the projector type color display device, in particular, the optical structure thereof, is discussed.

Referring to FIG. 19, a liquid-crystal projector 1100 can include three liquid-crystal modules, each including the electrooptical device 100 having the driving circuit on the TFT array substrate. The liquid-crystal projector 1100 thus includes light valves 100R, 100G, and 100B for RGB colors. When light is emitted from a lamp unit 1102 as a white light source such as a metal halide lamp in the liquid-crystal projector 1100, the light is separated into three RGB color beams through three mirrors 1106 and two dichroic mirrors 1108, and the three color light beams are then guided to respective light valves 100R, 100G, and 100B. The blue color beam travels along a path longer than those for the red and green color beams, and to prevent loss, the blue color beam is guided through a relay lens system 1121, composed of an incident lens 1122, a relay lens 1123, and an exit lens 1124. The red, green, and blue light beams respectively color-modulated by the electrooptical devices 100R, 100G, and 100B are incident on a dichroic prism 1112. The three color images are synthesized, and a synthesized color image is then projected by a projection lens 1114 onto a screen 1120.

It should be understood that the present invention is not limited to the above-discussed embodiment, and is modified within the scope and spirit of the invention described in the specification, and such modified versions of the substrate assembly, the test method, the electrooptical device, the manufacturing method, and the electronic equipment fall within the scope of the present invention.

What is claimed is:
1. A method of testing a substrate assembly, the substrate assembly comprising:
a substrate;
a peripheral circuit embedded in the substrate;
a first wiring arranged on the substrate;
an integrated circuit having a first terminal connected to an interconnection portion arranged on the first wiring on the substrate;
a second wiring which extends from the interconnection portion in such a manner that at least a portion of the second wiring is routed in a portion of the substrate facing the integrated circuit;
a first external circuit connection terminal arranged on the second wiring in a portion of the substrate not facing the integrated circuit;
a third wiring routed through the portion of the substrate facing the integrated circuit; and
a second external circuit connection terminal arranged on the third wiring in the portion of the substrate not facing the integrated circuit, and
the integrated circuit further comprising a second terminal, which is connected to another interconnection portion arranged on the third wiring,
the method comprising:
bringing a test probe into contact with the first external circuit connection terminal after the integrated circuit is connected to the substrate, and
performing an electrical test on the integrated circuit through the test probe.
2. The method of testing a substrate assembly according to claim 1, wherein the interconnection portion being an interconnection pad arranged on the substrate.
3. The method of testing a substrate assembly according to claim 1, wherein the first terminal being an output terminal of the integrated circuit,
the second terminal being an input terminal of the integrated circuit,
the first external circuit connection terminal being a test terminal for picking up an output signal from the integrated circuit, and
the second external circuit connection terminal being a drive terminal for inputting a variety of signals that operate the substrate assembly.
4. The method of testing a substrate assembly according to claim 1, wherein the first terminal and the second terminal being positioned on the surface of the integrated circuit facing the substrate.
5. The method of testing a substrate assembly according to claim 4, wherein a plurality of first terminals and a plurality of second terminals being arranged and positioned in a zigzag configuration on the surface of the integrated circuit facing the substrate.
6. The method of testing a substrate assembly according to claim 1, wherein the peripheral circuit comprising a thin-film transistor.
7. The method of testing a substrate assembly according to claim 1, wherein the substrate assembly further comprises another integrated circuit in place of the peripheral circuit.
8. The method of testing a substrate assembly according to claim 1, further comprising:
performing another electrical test on the peripheral circuit before the integrated circuit is connected to the substrate.
9. The method of testing the substrate assembly of claim 1, the substrate assembly further comprising:
a pixel electrode;
a thin-film transistor connected to the pixel electrode; and
a data line and a scanning line that are respectively connected to the thin-film transistor,
each of the peripheral circuit and the integrated circuit comprising a portion of a circuit that drive the data line and the scanning line.

10. The method of testing the substrate assembly of claim 9, the peripheral circuit and the integrated circuit being arranged in a peripheral area surrounding an image display area within which a plurality of pixel electrodes are arranged.

11. The method of testing the substrate assembly of claim 9, the peripheral circuit comprising a sampling circuit connected to the data line, and the integrated circuit comprising a driving circuit, having a shift register, for driving the data line and the scanning line.

12. The method of testing the substrate assembly of claim 9, wherein the substrate assembly is located in electronic equipment.

* * * * *